(12) United States Patent
Oman et al.

(10) Patent No.: US 10,443,728 B1
(45) Date of Patent: Oct. 15, 2019

(54) ENHANCED SEAL

(71) Applicant: Orbit Irrigation Products, LLC, North Salt Lake, UT (US)

(72) Inventors: Carter Timothy Oman, West Valley City, UT (US); Michael Bryan Doran, Salt Lake City, UT (US); Karl L. Connolly, Bountiful, UT (US); Mitchell Lee Price, Springville, UT (US); Andrew Mark Urry, Riverton, UT (US)

(73) Assignee: Orbit Irrigation Products, LLC, North Salt Lake, UT (US)

(*) Notice: Subject to any disclaimer, the term of this patent is extended or adjusted under 35 U.S.C. 154(b) by 0 days.

(21) Appl. No.: 15/932,250

(22) Filed: Feb. 16, 2018

Related U.S. Application Data

(63) Continuation-in-part of application No. 15/149,076, filed on May 6, 2016, now Pat. No. 10,125,903, which is a continuation-in-part of application No. 15/149,081, filed on May 6, 2016.

(60) Provisional application No. 62/157,893, filed on May 6, 2015, provisional application No. 62/157,895, filed on May 6, 2015.

(51) Int. Cl.
*F16J 15/02* (2006.01)
*F16L 15/00* (2006.01)
*F16L 31/00* (2006.01)
*F16L 33/18* (2006.01)

(52) U.S. Cl.
CPC ........... *F16J 15/025* (2013.01); *F16J 15/022* (2013.01); *F16L 15/008* (2013.01); *F16L 31/00* (2013.01); *F16L 33/18* (2013.01)

(58) Field of Classification Search
CPC ......... F16L 33/16; F16L 33/18; F16L 33/224; F16L 19/0218; F16L 31/00; F16J 15/022
See application file for complete search history.

(56) References Cited

U.S. PATENT DOCUMENTS

| 1,329,398 | A | 2/1920 | Hachmann |
|---|---|---|---|
| 1,936,552 | A | 11/1933 | Goss |
| 2,120,275 | A | 6/1938 | Cowles |
| 2,146,756 | A | 2/1939 | Miller |
| 2,245,101 | A | 6/1941 | Cole |
| 2,467,520 | A | 4/1949 | Brubaker |

(Continued)

FOREIGN PATENT DOCUMENTS

| EP | 503737 | 9/1992 |
|---|---|---|
| EP | 2045502 | 1/2012 |

(Continued)

OTHER PUBLICATIONS

Restriction Requirement, U.S. Appl. No. 15/149,081, dated Aug. 31, 2018 (shown in attachment 10).

(Continued)

*Primary Examiner* — Nicholas L Foster
(74) *Attorney, Agent, or Firm* — Austin Rapp

(57) ABSTRACT

An enhanced seal may comprise an inner portion and an outer portion. The inner portion may comprise an inner cylindrical portion and an inner annular portion. The outer portion may comprise an outer cylindrical portion and an outer annular portion. The inner portion may be made of a harder material than the outer portion and may provide support to the outer portion.

15 Claims, 23 Drawing Sheets

(56) References Cited

U.S. PATENT DOCUMENTS

| | | | |
|---|---|---|---|
| 3,055,682 A | 9/1962 | Bacher | |
| 3,239,252 A | 3/1966 | Schmitt | |
| 3,492,410 A | 1/1970 | Kelly | |
| 3,647,934 A | 3/1972 | Hurtt | |
| 3,752,506 A | 8/1973 | Fouts | |
| 4,169,967 A | 10/1979 | Bachle | |
| 4,392,678 A | 7/1983 | Adamczyk | |
| 4,736,969 A | 4/1988 | Fouts | |
| 4,801,158 A * | 1/1989 | Gomi | F16L 25/0036 285/330 |
| 4,805,942 A | 2/1989 | Goodridge | |
| 4,834,423 A * | 5/1989 | DeLand | F16L 37/0987 285/317 |
| 5,370,424 A | 12/1994 | Wendorff | |
| 6,409,175 B1 | 6/2002 | Evans | |
| 6,860,520 B2 | 3/2005 | Schwab | |
| 7,021,672 B2 * | 4/2006 | Ericksen | F16L 37/008 285/181 |
| 7,445,247 B2 * | 11/2008 | Ericksen | F16L 37/008 285/104 |
| 7,607,700 B2 | 10/2009 | Duquette | |
| 7,735,876 B2 | 6/2010 | Chiu | |
| 7,810,851 B2 * | 10/2010 | Wangsgaard | F16L 15/08 239/600 |
| 7,914,048 B2 | 3/2011 | Shemtov | |
| 7,980,601 B2 | 7/2011 | Oh | |
| 8,910,980 B2 | 12/2014 | Neal | |
| 9,429,262 B2 * | 8/2016 | Ericksen | F16L 37/091 |
| 9,604,404 B2 * | 3/2017 | Ericksen | F16L 43/008 |
| 10,125,903 B1 * | 11/2018 | Doran | F16J 15/025 |
| 2004/0240940 A1 * | 12/2004 | Ericksen | F16L 37/008 405/40 |
| 2005/0206160 A1 * | 9/2005 | Ericksen | F16L 37/008 285/308 |
| 2006/0097517 A1 * | 5/2006 | Wu | F16L 33/223 285/305 |
| 2009/0160178 A1 * | 6/2009 | Ericksen | F16L 37/008 285/24 |
| 2009/0160179 A1 * | 6/2009 | Ericksen | F16L 37/008 285/24 |
| 2011/0304137 A1 * | 12/2011 | Ericksen | F16L 37/091 285/331 |
| 2012/0248764 A1 * | 10/2012 | Ericksen | F16L 43/008 285/331 |
| 2013/0049358 A1 | 2/2013 | Wolff | |
| 2014/0116552 A1 | 5/2014 | Kury | |
| 2014/0138944 A1 | 5/2014 | Kury | |
| 2015/0316187 A1 * | 11/2015 | Matsubara | F16L 33/26 285/390 |

FOREIGN PATENT DOCUMENTS

| | | |
|---|---|---|
| FR | 564619 | 1/1924 |
| FR | 1101782 | 10/1955 |
| FR | 2468826 | 5/1981 |
| GB | 1494377 | 12/1977 |
| WO | 2014139802 | 9/2014 |

OTHER PUBLICATIONS

U.S. Appl. No. 15/149,076, filed May 6, 2016, Doran.

U.S. Appl. No. 15/149,081, filed May 6, 2016, Price.

Orbit Irrigation Products, Inc., Push on Mender (images 1-168), You Tube video [Online] [retrieved Sep. 8, 2016], apparently uploaded on or before Jun. 24, 2014, Retrieved from the Internet: < URL: https://www.youtube.com/watch?v=qJ57p0wCuXo&feature=youtu.be> (shown in Attachment 1, Parts 1-7).

J.R. Wearing, Minimising [sic] Leakage of Hydraulic Connectors, pp. 16-28, Published on or before 1984. (shown in Attachment 2).

U.S. Appl. No. 62/157,895, Dated May 6, 2015 (shown in Attachment 3).

U.S. Appl. No. 62/157,893, Dated May 6, 2015 (shown in Attachment 4).

U.S. Appl. No. 60/371,559, Dated Apr. 10, 2002 (shown in Attachment 5).

U.S. Appl. No. 60/467,176, Dated May 1, 2003 (shown in Attachment 6).

File History for U.S. Appl. No. 10/807,747, all mail room dates on or before Sep. 21, 2006 (shown in Attachment 7).

Preliminary Amendment, U.S. Appl. No. 15/149,081, dated Jul. 18, 2017 (shown in Attachment 8).

Preliminary Amendment, U.S. Appl. No. 15/149,076, dated Aug. 16, 2017 (shown in Attachment 9).

Notice of Allowance and Fee(s) Due (including a Notice of Allowability section, an Examiner's Amendment section, an Allowable Subject Matter section, and a Reasons for Allowance section), U.S. Appl. No. 15/149,076, dated Jul. 11, 2018 (shown in attachment 10).

Restriction Requirement Response, U.S. Appl. No. 15/149,081, dated Oct. 30, 2018 (shown in attachment 11).

Office Action, U.S. Appl. No. 15/149,081, dated Feb. 20, 2019 (shown in attachment 12).

Office Action Response, U.S. Appl. No. 15/149,081, dated Jun. 20, 2019 (shown in attachment 13).

Applicant-Initiated Interview Summary, U.S. Appl. No. 15/149,081, dated Jun. 25, 2019 (shown in attachment 14).

* cited by examiner

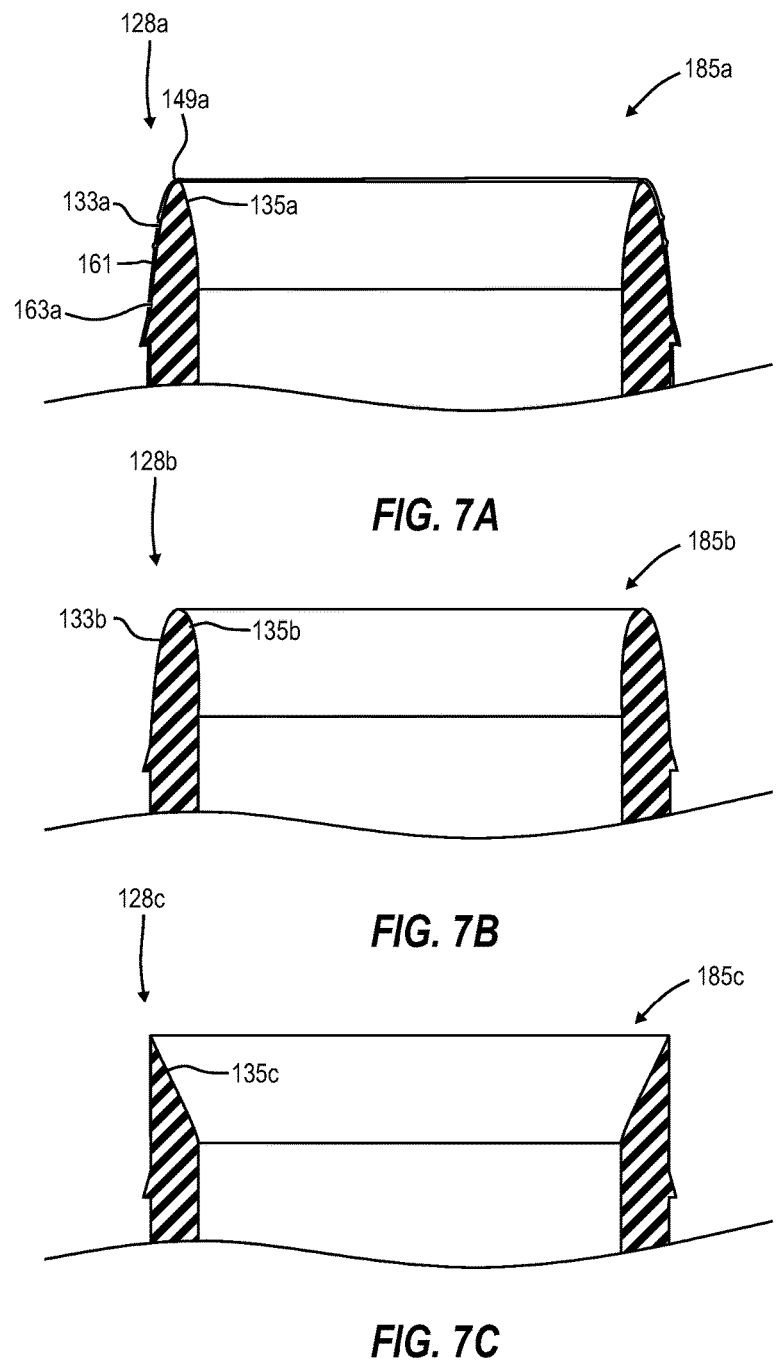

ENHANCED SEAL

RELATED APPLICATIONS

This application claims priority to and is a continuation-in-part application of U.S. application. Ser. No. 15/149,076, which was filed on May 6, 2016, and is entitled ENHANCED SEAL, which claims priority to U.S. Provisional App. No. 62/157,893 which was filed on May 6, 2015, and is entitled ENHANCED SEAL, and claims priority to and is a continuation-in-part application of U.S. application Ser. No. 15/149,081, which was filed on May 6, 2016, and is entitled HOSE MENDING DEVICES AND METHODS (originally entitled HOSE MENDING DEVICES AND METHODS), which claims priority to U.S. Provisional App. No. 62/157,895, which was filed on May 6, 2015, and is entitled HOSE MENDER. Each of the foregoing applications is incorporated herein in its entirety by this reference.

TECHNICAL FIELD

The present invention relates generally to devices and methods for creating an enhanced fluid-tight seal between fluid conveying devices.

BACKGROUND

The O-ring seal has existed for quite some time. However, improvements in devices and methods for creating a fluid-tight seal between two conduits and/or other fluid conveying devices (e.g., a hose faucet, a sprinkler, or a hose nozzle) are desirable.

SUMMARY

Embodiments of the disclosed subject matter are provided below for illustrative purposes and are in no way limiting of the claimed subject matter.

An enhanced seal is disclosed. The enhanced seal may comprise an outer portion including an outer cylindrical portion and an outer annular portion. The outer cylindrical portion may comprise an outer cylindrical portion proximal end, an outer cylindrical portion distal end, an outer cylindrical portion outer dimension, and an outer cylindrical portion length dimension extending from the outer cylindrical portion proximal end to the outer cylindrical portion distal end.

The annular portion may comprise an outer annular portion proximal end, an outer annular portion distal end, an outer annular portion outer dimension and an outer annular portion length dimension extending from the outer annular portion proximal and to the outer annular portion distal end.

The outer cylindrical portion proximal end being secured to or integrally formed with the outer annular portion proximal end, the outer annular portion outer dimension being greater than the outer cylindrical portion outer dimension, and the outer cylindrical portion length dimension being at least twice as great as the outer annular portion length dimension;

An inner portion may comprise an inner cylindrical portion and an inner annular portion. The inner cylindrical portion may be secured to or integrally formed with the inner annular portion. The inner cylindrical portion may be disposed at least partially within the outer cylindrical portion, and the inner annular portion may be disposed at least partially within the outer annular portion. A combination of the inner portion and outer portion may define a central passageway.

The outer portion may comprise a first set of one or more materials having a hardness within a Shore A durometer scale. The inner portion may comprise a second set of one or more materials having a hardness within a Shore D durometer scale.

The first set of one or more materials may be between about 60 and about 70 on the Shore A durometer scale or may be between 60 and 70 on the Shore A durometer scale.

The second set of one or more materials may be between about 80 and about 90 on the Shore D durometer scale or may be between 80 and 90 on the Shore D durometer scale.

The outer cylindrical portion may comprise a narrowing portion and a portion of uniform thickness.

The enhanced seal may comprise a set of two or more annular protrusions extending radially outward from an exterior surface of the outer cylindrical portion. Each of the set of two or more annular protrusions may be separated by an intervening space along the outer cylindrical portion length dimension. A method of using the enhanced seal is also disclosed. The method may enhance a seal between a first conduit having a first coupling and a second conduit having a second coupling, the second coupling being configured to mate with the first coupling, the first conduit being selectively in fluid communication with a pressurized fluid source, comprising. The method may involve positioning the enhanced seal in either the first coupling or the second coupling such that the outer cylindrical portion is upstream relative to the outer annular portion when fluid from the pressurized fluid source flows through the first conduit and the second conduit and when the first coupling and second coupling are secured together. The method may further involve securing the first coupling and second coupling together.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIGS. 7A-7E comprise cross-sectional views showing variations of a narrowing portion of the enhanced seal shown in FIG. 1.

Figure 1:
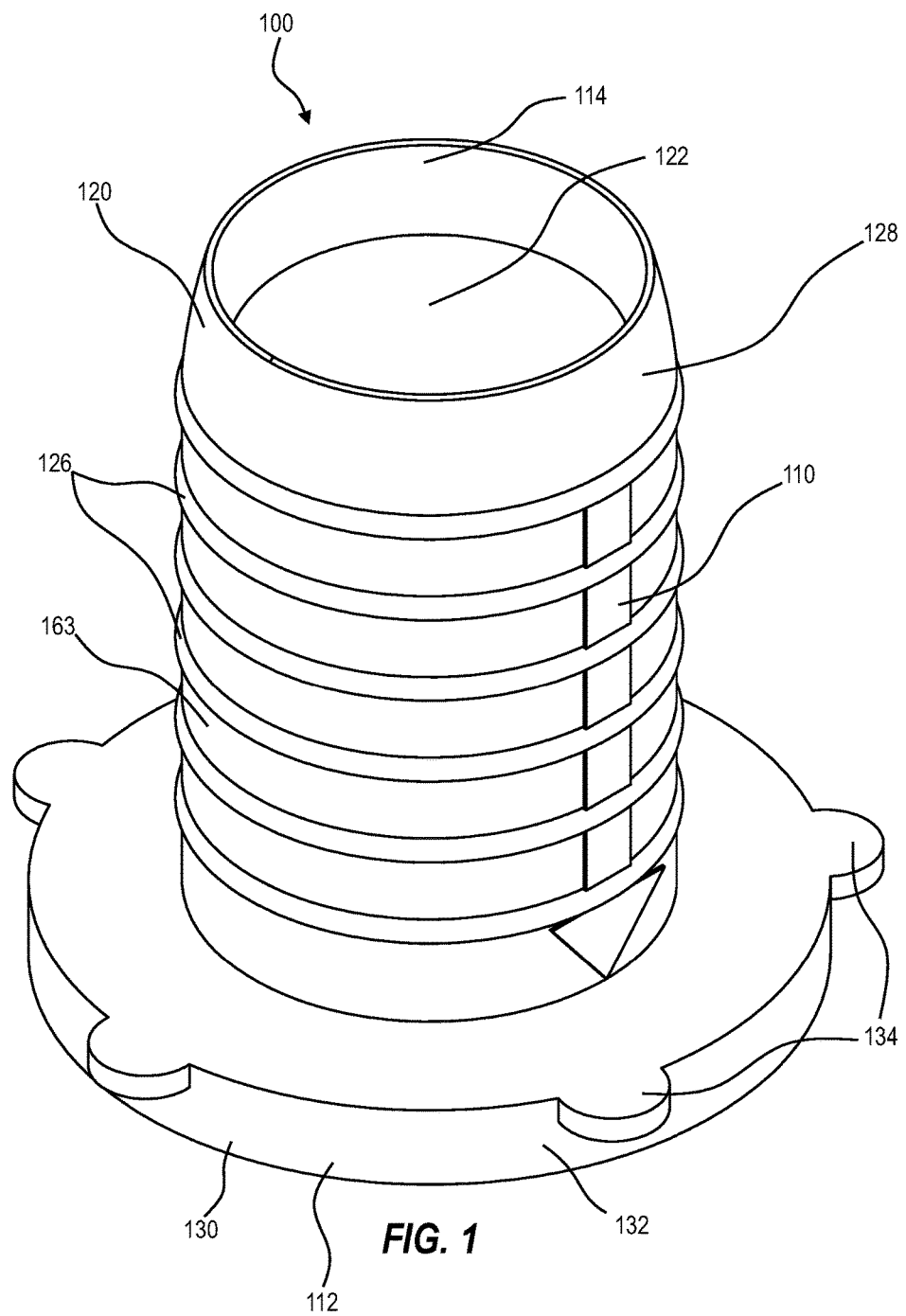
FIG. 1 is an elevated perspective view of one embodiment of an enhanced seal.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. It should be noted that the drawings in FIGS. 1-6 and 10-15 of this application are to scale and thus relative proportions and dimensions of the various features and components illustrated in one of these drawings (but not by a comparison between different drawings) may be ascertained from the drawings. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

As used in this application, the phrases "an embodiment," "in various embodiments," "in one or more embodiments," or "in one embodiment" or the like do not refer to a single, specific embodiment of the disclosed subject matter. Instead, these phrases signify that the identified portion or portions of the disclosed subject matter may be combined with other aspects of the disclosure without limitation.

The term "integrally formed" refer an item or component that is manufactured integrally, i.e., as a single piece, without requiring the assembly of multiple pieces. Multiple parts may be integrally formed if they are formed from a single workpiece.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

Referring specifically to FIG. 1 and generally to FIGS. 2-6, various views of one embodiment of the enhanced seal 100 are provided. The enhanced seal 100 may comprise an annular portion 130 having an annular portion peripheral wall 132. The annular portion 130 may also comprise one or more tabs 134 extending radially outward from the annular portion peripheral wall 132. The enhanced seal 100 may also comprise a cylindrical portion 120 (shown in FIGS. 1-4 and 6) having a cylindrical portion peripheral wall 128 (shown in FIGS. 1-4 and 6). The cylindrical portion 120 may also comprise one or more annular protrusions 126 (shown in FIGS. 1-4 and 6) extending from a cylindrical portion exterior surface 163 (shown in FIGS. 1-4 and 6) of the cylindrical portion peripheral wall 128 (shown only in FIGS. 1-4 and 6). The enhanced seal 100 may include a combined central passageway 122 (shown in FIGS. 1-2 and 4-6). The combined central passageway 122 may be cylindrical in shape and include a combined central longitudinal axis 116 (shown in FIGS. 4-6). The enhanced seal 100 may also comprise a directional arrow 110 (shown only in FIGS. 1-2), which indicates the direction of fluid flow during use of the enhanced seal 100. Accordingly, the enhanced seal 100 comprises an upstream end 114 (shown only in FIGS. 1-4 and 6) and a downstream end 112 (shown only in FIGS. 1-3 and 5-6).

Figure 2:
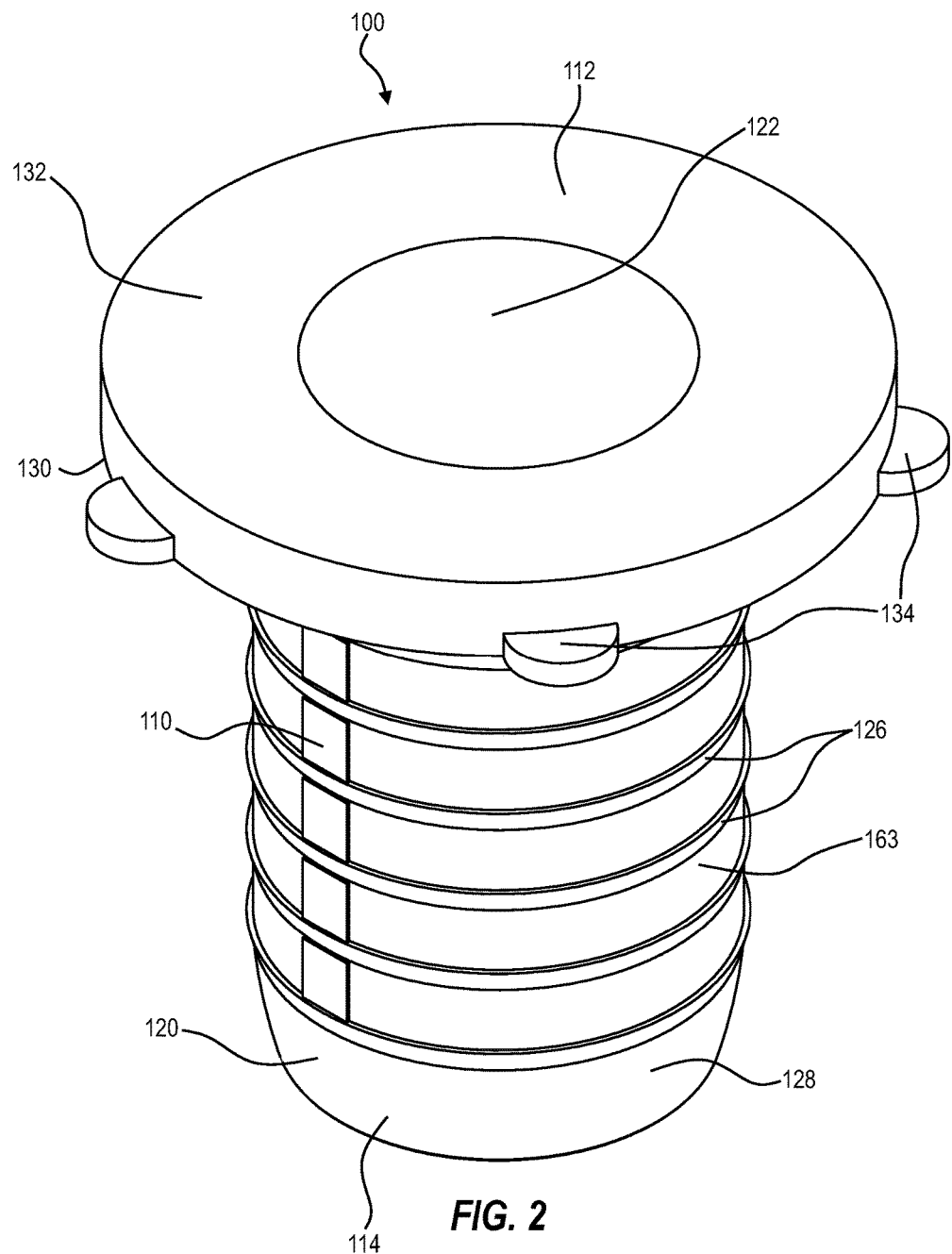
FIG. 2 is a lower, perspective view of the embodiment of the enhanced seal shown in FIG. 1.
Figure 3:
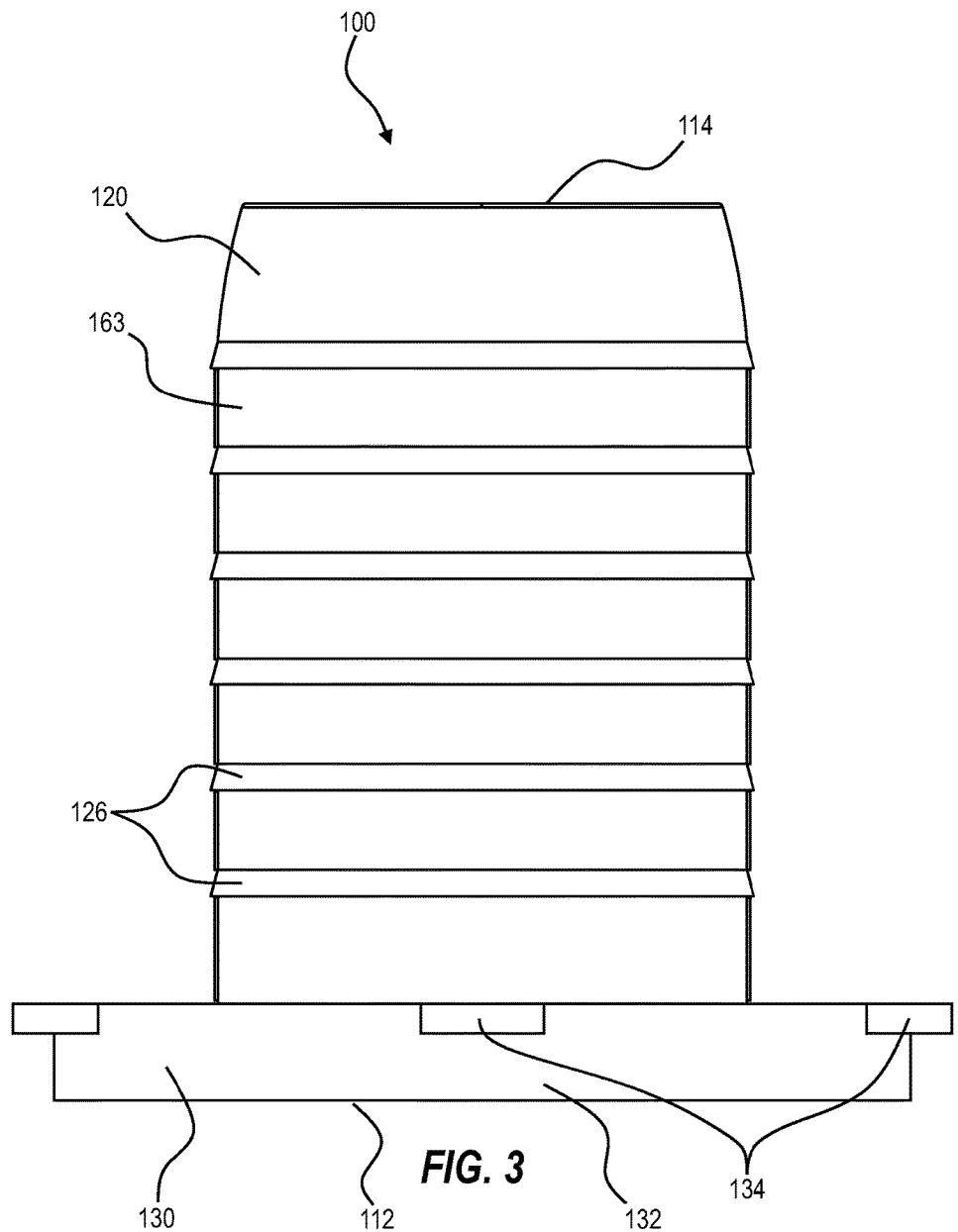
FIG. 3 is a side view of the embodiment of the enhanced seal shown in FIG. 1.
Figure 4:
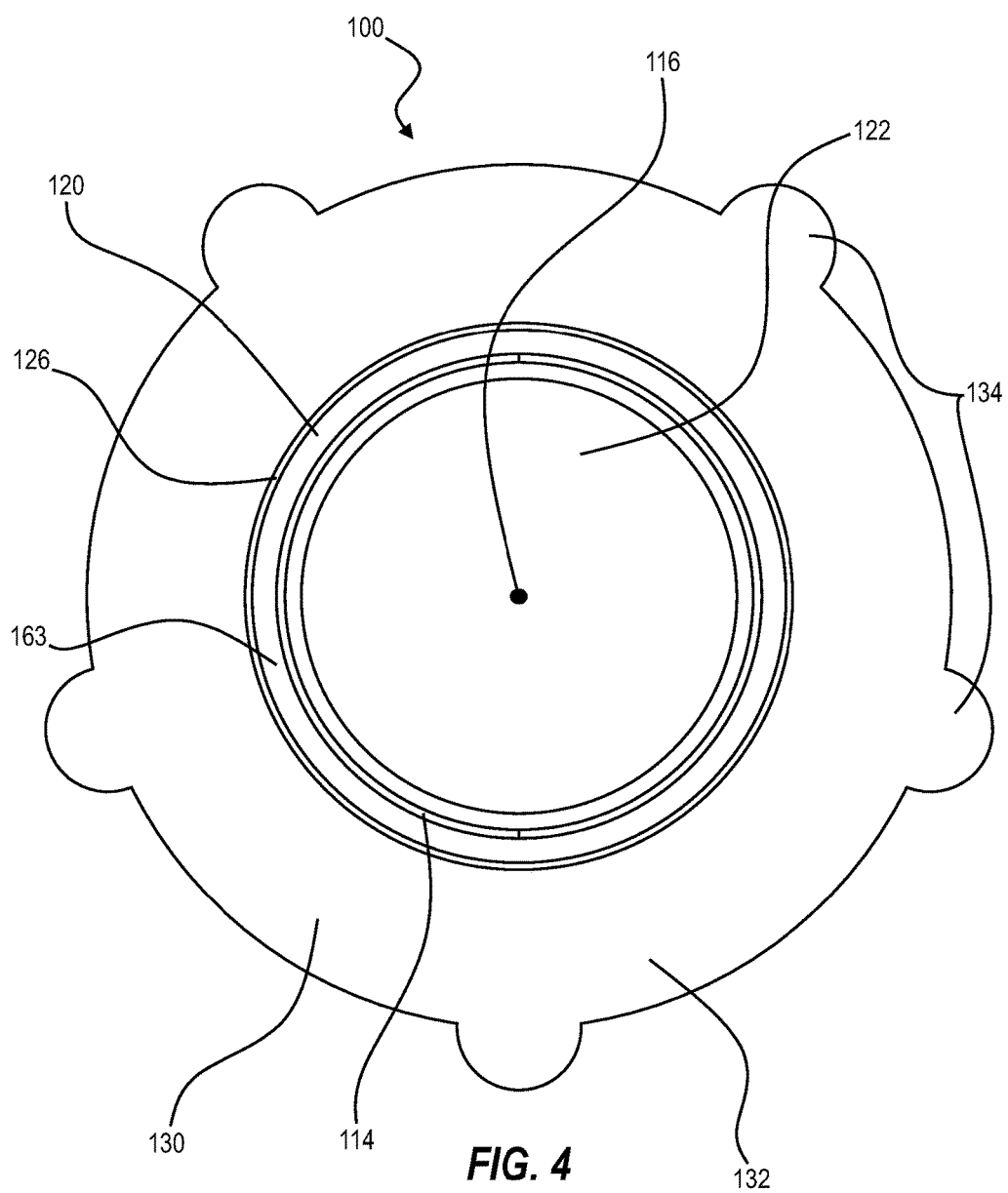
FIG. 4 is a top view of the embodiment of the enhanced seal shown in FIG. 1.
Figure 5:
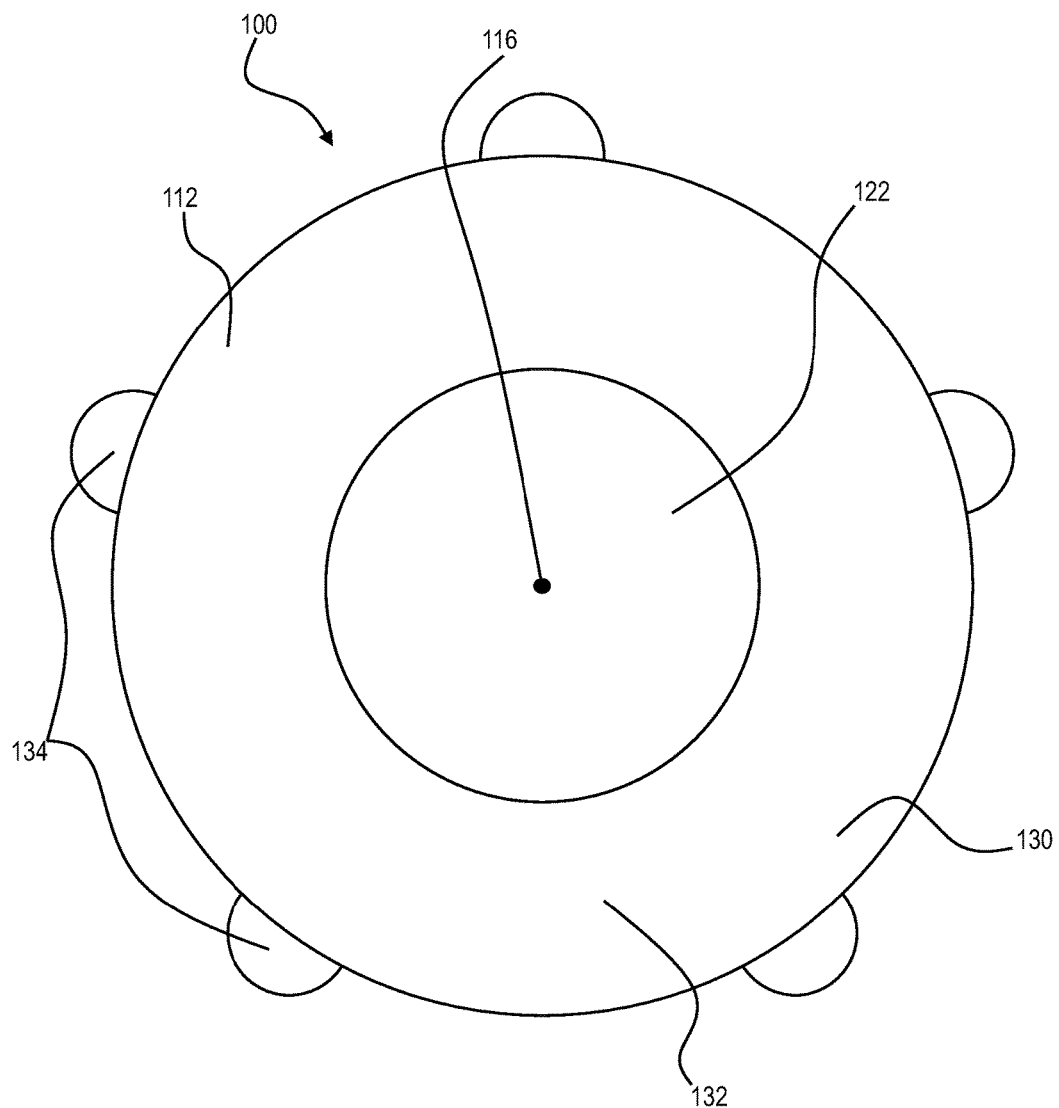
FIG. 5 is a bottom view of the embodiment of the enhanced seal shown in FIG. 1.

Referring now specifically to FIGS. 1-2, the cylindrical portion 120, in various embodiments, may comprise a directional arrow 110 (best seen in FIG. 1) positioned on the cylindrical portion peripheral wall 128. In various alternative embodiments, the directional arrow 110 may be partially or completely disposed on the annular portion 130. The directional arrow 110 indicates the direction of fluid flow within the enhanced seal 100 when the enhanced seal 100 is properly installed and in use. The directional arrow 110 may be of a different color than remaining or surrounding portions of the enhanced seal 100 or may be raised or recessed relative to remaining or surrounding portions of the enhanced seal 100.

Figure 6:
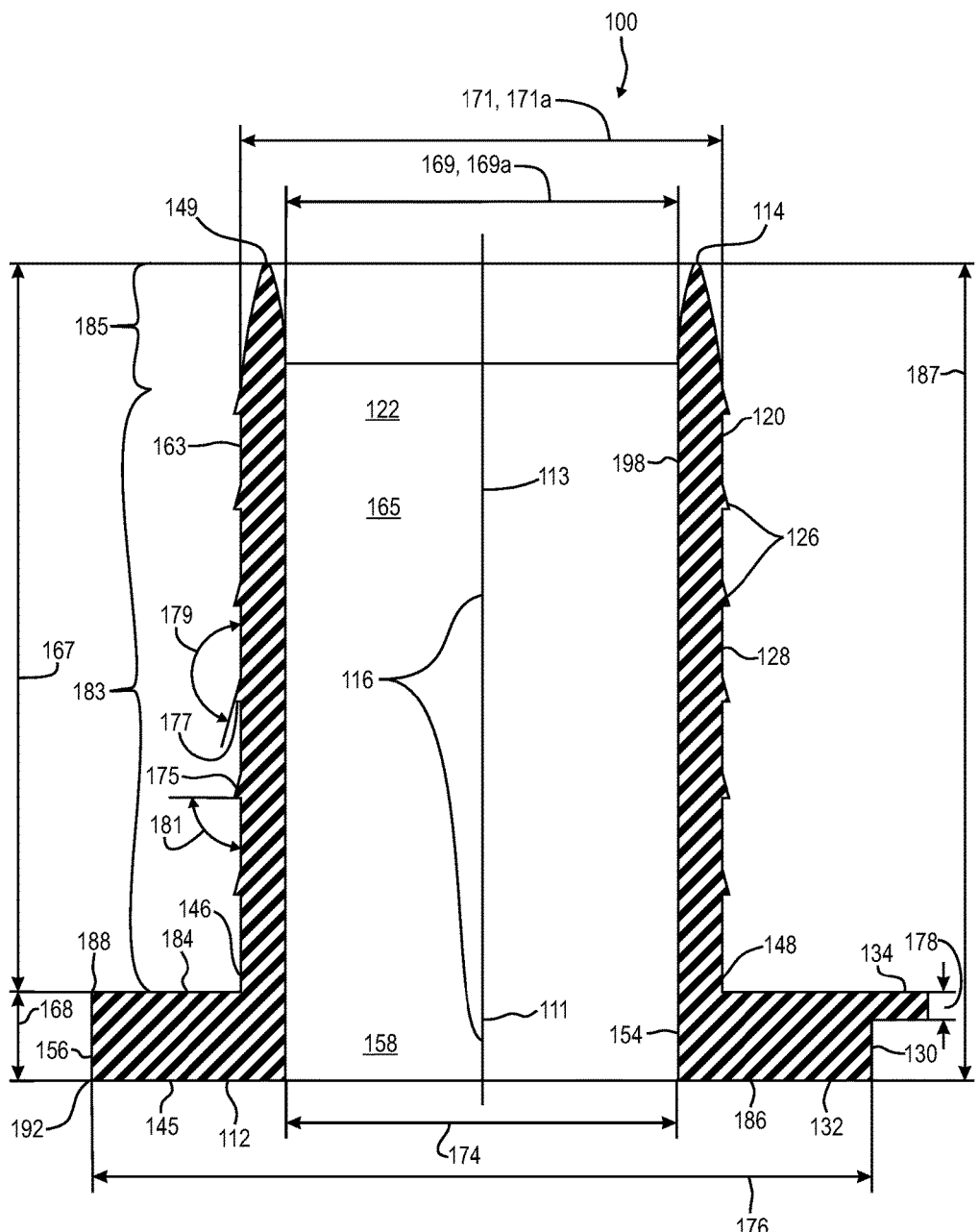
FIG. 6 is a side, cross-sectional view of the enhanced seal shown in FIG. 1.
Figure 7D:
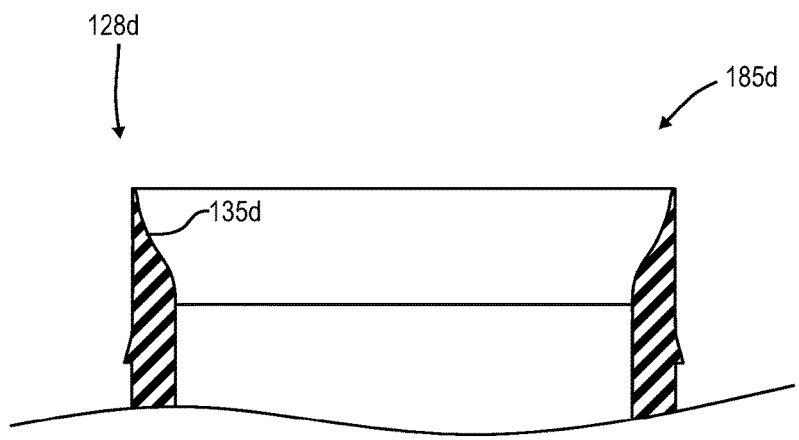
Figure 7E:
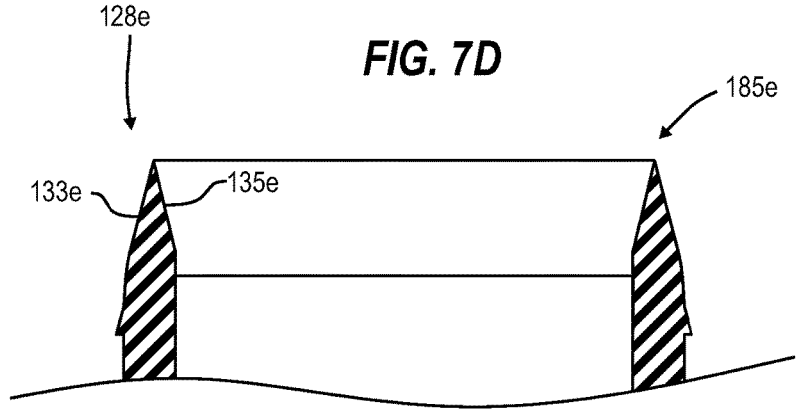

Referring now specifically to FIG. 6 and generally to FIGS. 1-5 (only certain elements discussed below are labeled or shown in all of FIGS. 1-5), the annular portion 130 may be generally in the shape of an annular disk and may comprise an annular portion peripheral wall 132. The annular portion peripheral wall 132 may comprise an annular portion distal end 145 and an annular portion proximal end 146. The annular portion distal end 145 is external to the enhanced seal 100, while the annular portion proximal end 146 is internal to the enhanced seal 100. The annular portion proximal end 146 abuts the cylindrical portion 120, or, more specifically, abuts a cylindrical portion proximal end 148.

The annular portion peripheral wall 132 may comprise an annular portion interior surface 154 and an annular portion exterior surface 156. The annular portion interior surface 154 may circumscribe the annular portion central passageway 158, which extends from the annular portion distal end 145 to the annular portion proximal end 146. The annular portion central passageway 158 may be cylindrical in shape, as illustrated in FIGS. 1-6.

Referring now more specifically to FIG. 6, an annular portion length dimension 168 may extend from the annular portion distal end 145 to the annular portion proximal end 146. An annular portion inner dimension 174 may be perpendicular to the annular portion length dimension 168 and may extend between opposing sides of the annular portion interior surface 154. An annular portion outer dimension 176 may be perpendicular to the annular portion length dimension 168 and may extend between opposing sides of the annular portion exterior surface 156.

Referring still specifically to FIG. 6, as indicated above, the annular portion 130 may comprise a series of circumferentially spaced tabs 134. The tabs 134 may be circumferentially spaced at regular intervals. The tabs 134 may extend radially outward from the annular portion exterior surface 156. In the embodiment illustrated in FIG. 6, the tabs 134 may be in the shape of a semi-cylinder (as best illustrated in FIGS. 1 and 2). In alternative embodiments, the tabs 134 may have, for example, the shape of a cuboid, triangular prism, partial sphere or rectangular prism. As illustrated, the tabs 134 may have a tab length dimension 178 less than the annular portion length dimension 168 and may be situated on the annular portion exterior surface 156 adjacent to the annular portion proximal end 146 or the proximal planar surface 184 on the annular portion exterior surface 156. By way of example only, the annular portion length dimension 168 may be three to four times the tab length dimension 178. As will be explained later, the tabs 134 may interact with internal female threads into which the enhanced seal 100 may be positioned during use.

Referring still specifically to FIG. 6, the annular portion peripheral wall 132 may be in the shape of an annular disk. Accordingly, the annular portion proximal end 146 may comprise a proximal planar surface 184, and the annular portion distal end 145 may comprise a distal planar surface 186. The annular portion exterior surface 156 has a rounded, cylindrical shape (i.e., the annular portion exterior surface 156 has the same shape of the exterior surface of a cylinder). As illustrated best in FIG. 6, the proximal intersection 188 of the proximal planar surface 184 with the annular portion exterior surface 156 may be at a right angle. In alternative embodiments, this proximal intersection 188 may be rounded, scalloped, or chamfered. The distal intersection 192 of the distal planar surface 186 with the annular portion exterior surface 156, may likewise be, for example, at a right angle, as illustrated in FIG. 6, or, alternatively, may be rounded, scalloped, or chamfered.

As indicated above, the enhanced seal 100 may comprise a cylindrical portion 120 comprising a cylindrical portion peripheral wall 128. The cylindrical portion peripheral wall 128 may be generally in the shape of a cylindrical shell. The cylindrical portion peripheral wall 128 comprises a cylindrical portion interior surface 198 and the cylindrical portion exterior surface 163. The cylindrical portion peripheral wall 128 comprises a cylindrical portion distal end 149, which is external to the enhanced seal 100, and a cylindrical portion proximal end 148, which is internal to the enhanced seal 100. The cylindrical portion interior surface 198 circumscribes a cylindrical portion central passageway 165, which extends from the cylindrical portion proximal end 148 to the cylindrical portion distal end 149.

Referring still specifically to FIG. 6 and generally to FIGS. 1-5, a cylindrical portion length dimension 167 may extend from the cylindrical portion distal end 149 to the cylindrical portion proximal end 148. A cylindrical portion inner dimension 169 may be perpendicular to the cylindrical portion length dimension 167 and may extend between opposing sides of the cylindrical portion interior surface 198. A cylindrical portion outer dimension 171 may be perpendicular to the cylindrical portion length dimension 167 and may extend between opposing sides of the cylindrical portion exterior surface 163.

The cylindrical portion 120 may comprise a series of annular protrusions 126 that extend radially outward from the cylindrical portion exterior surface 163. The annular protrusions 126 may be spaced apart along the cylindrical portion length dimension 167. With reference specifically now to FIG. 6, the annular protrusions 126, in various embodiments, may comprise a long face 175 and a short face 177. The long face 175 may be disposed at a long face angle 179 (e.g., an obtuse angle) with respect to an adjacent or adjoining portion of the cylindrical portion exterior surface 163. The short face 177 may be disposed at a short face angle 181 (e.g., an acute or right angle) with respect to an adjacent or adjoining portion of the cylindrical portion exterior surface 163. In various embodiments, the long face angle 179 may be greater than the short face angle 181. The annular protrusions 126 may be in the shape of a frusto-conical shell (i.e., a peripheral portion of a frustum of a cone).

Referring still specifically to FIG. 6, the cylindrical portion peripheral wall 128 may comprise a portion of uniform thickness 183 and a narrowing portion 185. Within the portion of uniform thickness 183, a difference between the cylindrical portion outer dimension 171 and the cylindrical portion inner dimension 169 is the same (i.e., roughly the same taking into consideration any minor variation caused by the manufacturing process). Stated differently, within the portion of uniform thickness 183, both the cylindrical portion outer dimension 171 and the cylindrical portion inner dimension 169 are the same (i.e., roughly the same taking into consideration any minor variation caused by the manufacturing process).

Within the narrowing portion 185, either (1) the cylindrical portion inner dimension 169 increases relative to a cylindrical portion minimum inner dimension 169a in a direction extending from the cylindrical portion proximal end 148 to the cylindrical portion distal end 149 (hereinafter, "Increasing Inner Dimension"); (2) the cylindrical portion outer dimension 171 decreases relative to a cylindrical portion maximum outer dimension 171a in a direction extending from the cylindrical portion proximal end to the cylindrical portion distal end 149 (hereinafter, "Decreasing Outer Dimension"); or (3) both Increasing Inner Dimension and Decreasing Outer Dimension are used. Within the narrowing portion 185, use of the Decreasing Outer Dimension, mitigates the risk that the cylindrical portion distal end 149 will be caught and extended radially outward during insertion of the enhanced seal 100 into a hose or other conduit. Within the narrowing portion 185, use of the Increasing Inner Dimension mitigates the risk that when pressurized fluid is passing through a conduit in which the enhanced seal 100 is situated, the fluid will enter between the inner surface of the conduit and the cylindrical portion exterior surface 163, which may potentially result in a leak.

Cross-sectional views of five illustrative variations of narrowing portions 185a-e are illustrated in FIGS. 7A-E. The first variation of a narrowing portion 185a utilizes a cylindrical portion peripheral wall 128a having both Increasing Inner Dimension and Decreasing Outer Dimension. Further, both the Increasing Inner Dimension and Decreasing Outer Dimension comprise a curved cross-sectional shape. This variation of the narrowing portion 185a thus includes an exterior, convex cross-sectional edge 133a and an interior convex cross-sectional edge 135a. In addition, a lubricant 161 (e.g., silicone grease, or another type of bio-friendly non-petroleum-based lubricant) is on the cylindrical portion exterior surface 163a. The lubricant 161 reduces friction between the cylindrical portion exterior surface 163a during insertion of the enhanced seal 100 into a conduit and, like the Decreasing Outer Dimension, mitigates the risk that the cylindrical portion distal end 149a will catch and extend radially outward during the insertion process. The lubricant 161 may be used in connection with each of the embodiments of the enhanced seal 100 and variations of the narrowing portions 185a-e disclosed herein.

The second variation of a narrowing portion 185b utilizes both the Decreasing Outer Dimension and the Increasing Inner Dimension and employs a peripheral wall 128b having an exterior convex cross-sectional edge 133b (having greater curvature than the exterior, convex cross-sectional edge 133a shown in FIG. 7A) and an interior convex cross-sectional edge 135b (having greater curvature than the interior convex cross-sectional edge 135a shown in FIG. 7A). The third variation of the narrowing portion 185c employs a cylindrical wall 128c having only the Increasing Inner Dimension and has an interior, linear cross-sectional edge 135c. A fourth variation of the narrowing portion 185d employs only Increasing Inner Dimension and has a cylindrical portion peripheral wall 128d having an interior, concave cross-sectional edge 135d. A fifth variation of the narrowing portion 185e comprises both the Increasing Inner Dimension and the Decreasing Outer Dimension and has a cylindrical portion peripheral wall 128e comprising an exterior, linear cross-sectional edge 133e and an interior, linear, cross-sectional edge 135e. It should be once again emphasized that the variations of the narrowing portion 185a-e are merely illustrative. In addition, for example, an exterior, convex cross-sectional edge could be combined within an interior, concave edge or an exterior, linear cross-sectional edge could be combined with an interior, convex cross-sectional edge.

Referring once again specifically to FIG. 6, the annular portion 130 may comprise an annular portion central longitudinal axis 111 positioned within the annular portion central passageway 158, while the cylindrical portion 120 may comprise a cylindrical portion central longitudinal axis 113 positioned within the cylindrical portion central passageway 165. A combination of the annular portion central longitudinal axis 111 and the cylindrical portion central longitudinal axis 113 may be referred to as a combined central longitudinal axis 116.

The combined central passageway 122 (as best seen in FIG. 6) may comprise a combination of the annular portion central passageway 158 and the cylindrical portion central passageway 165. The annular portion central passageway 158 may be cylindrical in shape; the cylindrical portion central passageway 165 may also be cylindrical in shape; and, further, the combined central passageway 122 may likewise be cylindrical in shape.

The combined central longitudinal axis 116 may be centrally positioned within the combined central passageway 122. As indicated in connection with FIGS. 3, 4, and 6, the cylindrical portion peripheral wall 128, the annular portion peripheral wall 132, the annular protrusions 126 and the combined central passageway may be symmetrical about any plane passing through the combined central longitudinal axis 116.

It should also be noted that a combination of the annular portion length dimension 168 and the cylindrical portion length dimension 167 may be referred to as a combined length dimension 187 (i.e., a length dimension 187 of the enhanced seal 100, which may be referred to as the enhanced seal length dimension 187).

The annular portion 130 (including the annular portion peripheral wall 132 and, optionally, the tabs 134) and the cylindrical portion 120 (including the cylindrical portion peripheral wall 128 and optionally the annular protrusions 126 and the directional arrow 110) may be integrally formed; or, alternatively, may be secured to each other at the annular portion proximal end 146 and the cylindrical portion proximal end 148 using, for example, adhesives or ultrasonic welding.

Figure 8:
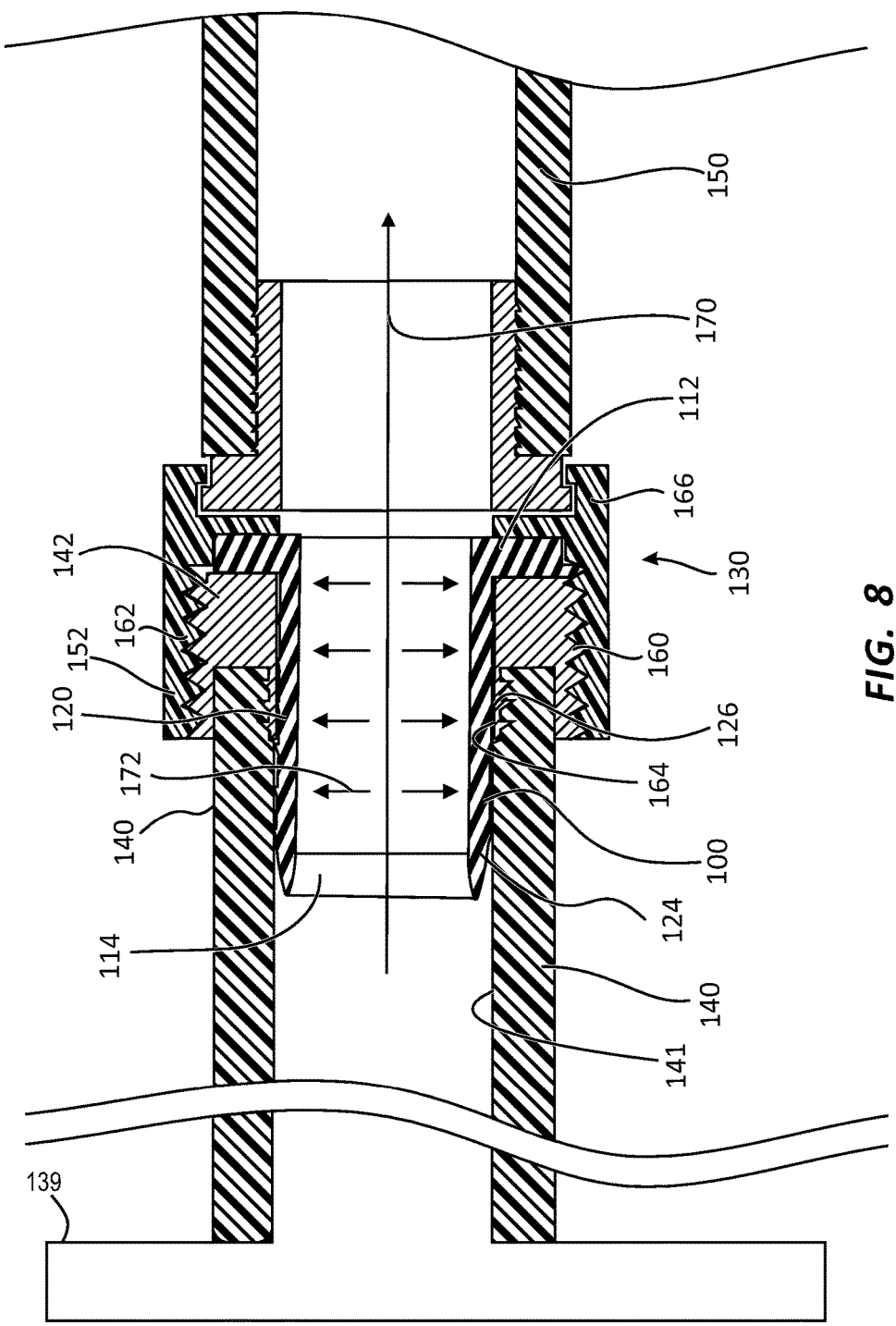
FIG. 8 is a cross-sectional view of a first hose coupled to a second hose employing the enhanced seal shown in FIG. 1.

FIG. 8 comprises a side cross-sectional view of the embodiment of the enhanced seal 100 shown in FIGS. 1-6 in use with two conduits 140, 150 coupled together. As illustrated in FIG. 6, the first conduit 140, having a male coupling 142, is coupled to the second conduit 150, having a female coupling 152. As illustrated, the female coupling 152 includes a rotatable portion 166 that may be turned to rotate the inward facing threads 162 of the female coupling 152 relative to the outward facing threads 160 of the male coupling 142. Of course, the illustrated couplings 142, 152 are only exemplary and other types of couplings may be used.

As illustrated in FIG. 8, the enhanced seal 100 is interposed between the male and female couplings 142, 152. In particular, the annular portion 130 is interposed between the rotatable portion 166 of the female coupling 152 and the male coupling 142 in a sealing engagement. The annular protrusions 126 of the cylindrical portion 120 contact the interior surface 164 of the male coupling 142 and the interior surface 141 of the first conduit 140 in a sealing engagement.

As illustrated, the fluid flow proceeds as indicated by the arrow 170 in FIG. 8. That is, the fluid flow proceeds from a pressurized fluid source 139 through the first conduit 140 towards the second conduit 150. Accordingly, the upstream end 114 of the enhanced seal 100 is oriented upstream relative to the downstream end 112 of the enhanced seal 100. In this orientation, the cylindrical portion 120 is also upstream relative to the annular portion 130. Accordingly, an outward radial pressure 172 is exerted on the cylindrical portion 120, resulting in greater engagement between the cylindrical portion 120 and the male coupling 142 and the conduit 140 such that potential leakage is mitigated. It should be specifically noted that the outward radial pressure 172 causes the annular protrusions 126 to engage the interior surface 164 of the male coupling 142 and/or the interior surface 141 of the first conduit 140, such that potential leakage is mitigated. Utilizing multiple annular protrusions 126, in operation, creates stages of protection, such that any leakage would have to pass through each of the stages created by multiple annular protrusions 126 in order for such a leak to extend outside of the enhanced seal 100. Thus, in operation, the enhanced seal 100 provides an enhanced sealing feature relative to conventional O-rings.

A method of using the enhanced seal 100 is thus disclosed. The method enhances a seal between a first conduit 140 having a first coupling 142 and a second conduit 150 having a second coupling 152. The second coupling 152 may be configured to mate with the first coupling 142. The first conduit 140 may be selectively in fluid communication with a pressurized fluid source 139. This method comprises positioning the enhanced seal 100 in either the first or the second coupling 142, 152 such that the cylindrical portion 120 will be upstream relative to the annular portion 130 when fluid from the pressurized fluid source 139 flows through the two conduits 140, 150 when the first and second coupling 142, 152 are secured together; and then securing the two couplings 142, 152 together.

Figure 9:
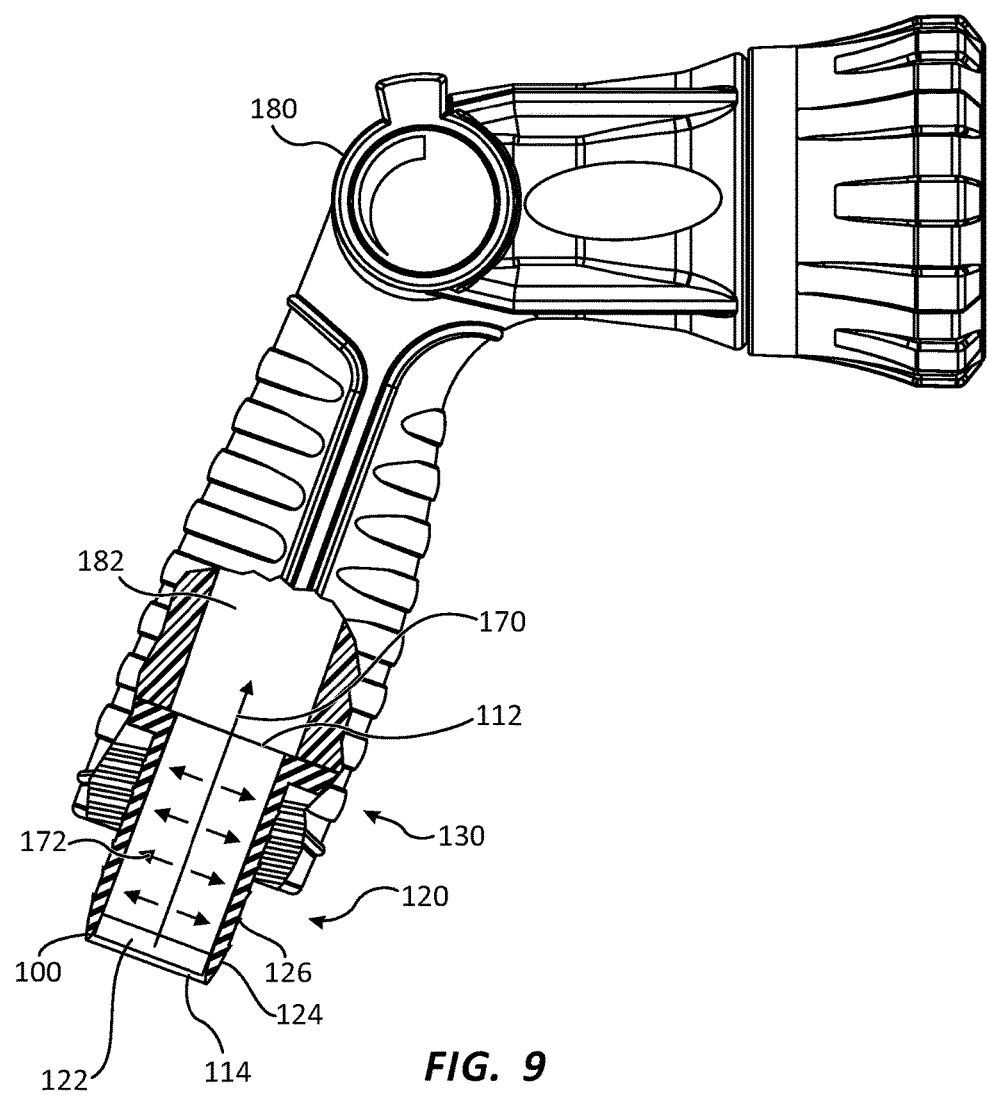
FIG. 9 is a partial cross-sectional view of a hose nozzle shown with a cross-sectional view of the enhanced seal of FIG. 1.

FIG. 9 comprises a partial cross-sectional view of a hose nozzle 180 engaged with the embodiment of the enhanced seal 100 shown in FIG. 1. As illustrated in FIG. 9, the enhanced seal 100 is positioned within the passageway 182 of the nozzle. For simplicity, a fluid source and upstream conduit are omitted from FIG. 9.

As explained previously, the enhanced seal 100 may include a cylindrical portion 120, including a narrowing region 124, one or more annular protrusions 126, and an annular portion 130. Also, as explained previously, the combined central passageway 122 extends through the enhanced seal 100. Accordingly, the combined central passageway 122 of the enhanced seal 100 is in fluid communication with the passageway 182 of the hose nozzle 180.

The direction of the fluid flow in operation is illustrated by the arrow 170. Accordingly, the enhanced seal 100 is oriented such that the upstream end 114 is upstream relative to the downstream end 112, and the cylindrical portion 120 is also upstream relative to the annular portion 130. Once again, in the case of fluid flow as indicated by the arrow 170, the radial pressure 172 would exert force on the enhanced seal 100, thus providing an enhanced seal and mitigating the risk of leaks in the sealed area, as explained in more detail previously.

Figure 10:
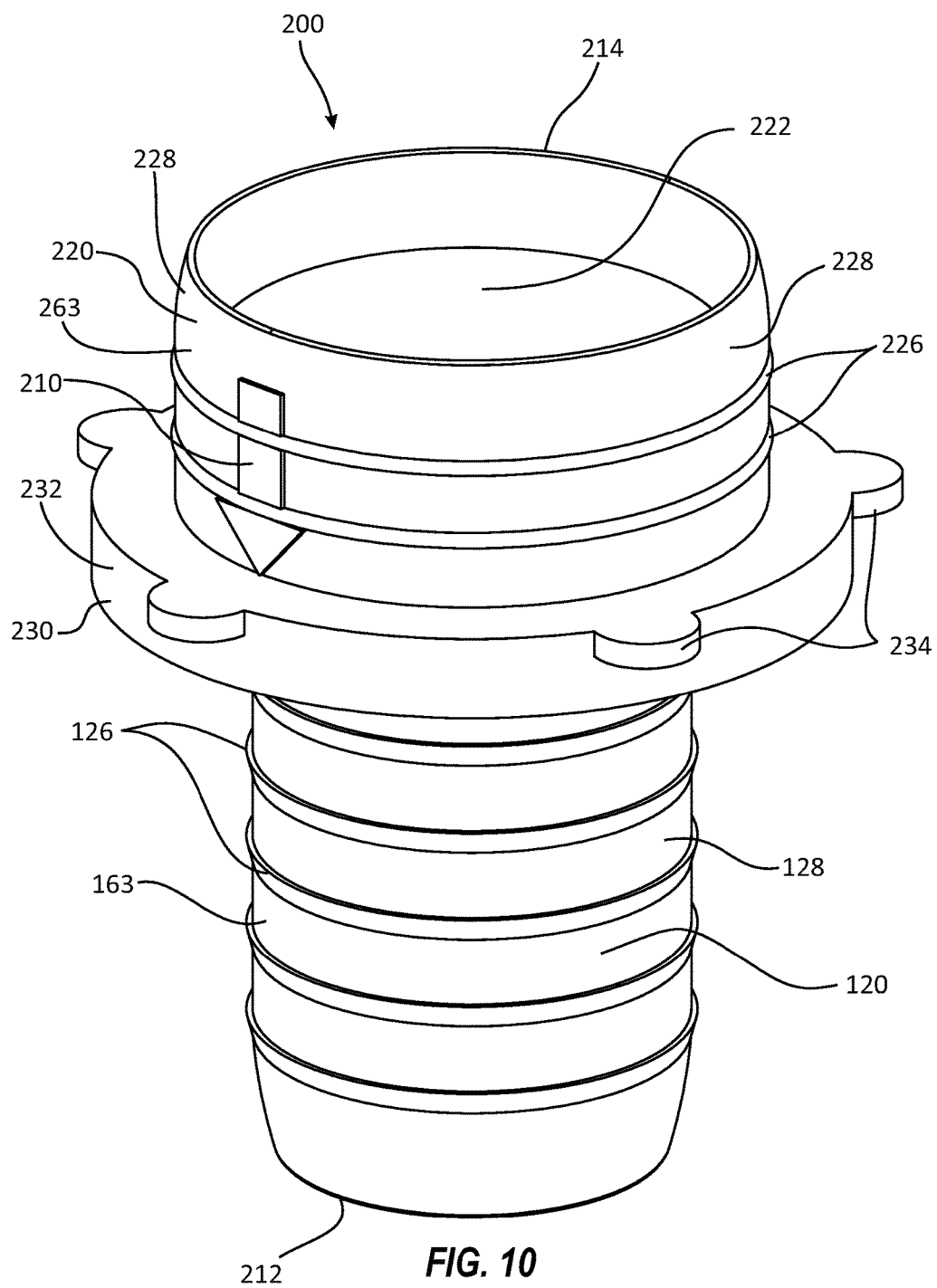
FIG. 10 is an elevated, perspective view of an alternative embodiment of the enhanced seal for use, for example, with a hose faucet.

Referring specifically to FIG. 10 and generally to FIGS. 11-15, various views of another embodiment of the enhanced seal 200 are provided. The enhanced seal 200 shown in these figures may comprise an annular portion 230 having an annular portion peripheral wall 232. The annular portion 230 may include one or more tabs 234 extending radially outward from the annular portion peripheral wall 232. The enhanced seal 200 may include a cylindrical portion 120 having a cylindrical portion peripheral wall 128 (shown in FIGS. 10-13 and 15). The cylindrical portion 120 may include one or more annular protrusions 126 (shown in FIGS. 10-13 and 15) extending from a cylindrical portion exterior surface 163 (shown in FIGS. 10-13 and 15) of the cylindrical portion peripheral wall 128 (shown in FIGS. 10-13 and 15). The enhanced seal 200 may define or circumscribe a unified central passageway 222 (shown in FIGS. 10-11 and 13-15). The unified central passageway 222 may be cylindrical in shape and include a unified central longitudinal axis 216 (shown in FIGS. 13-15). The enhanced seal 200 may also comprise a directional arrow 210 (shown in FIGS. 10-12), which indicates the direction of fluid flow during use of the enhanced seal 200. Accordingly, the enhanced seal 200 comprises an upstream end 214 (shown in FIGS. 10-12 and 14-15) and a downstream end 212 (shown in FIGS. 10-13 and 15).

Unlike the embodiment of the enhanced seal 100 shown in FIGS. 1-6, the enhanced seal 200 shown in FIGS. 10-15 includes a second cylindrical portion 220. Referring now specifically to FIG. 10 and generally to FIGS. 11-15, the second cylindrical portion 220 may extend away from the annular portion 230 in an opposite direction from the cylindrical portion 120. The second cylindrical portion 220 may have a second cylindrical portion peripheral wall 228 (shown in FIGS. 10-12 and 14-15). The second cylindrical portion 220 may also include one or more second cylindrical portion annular protrusions 226 (shown only in FIGS. 10-12 and 14-15) extending from a second cylindrical portion exterior surface 263 (shown only in FIGS. 10-12 and 14-15) of the second cylindrical portion peripheral wall 228 (shown only in FIGS. 10-12 and 14-15).

Figure 11:
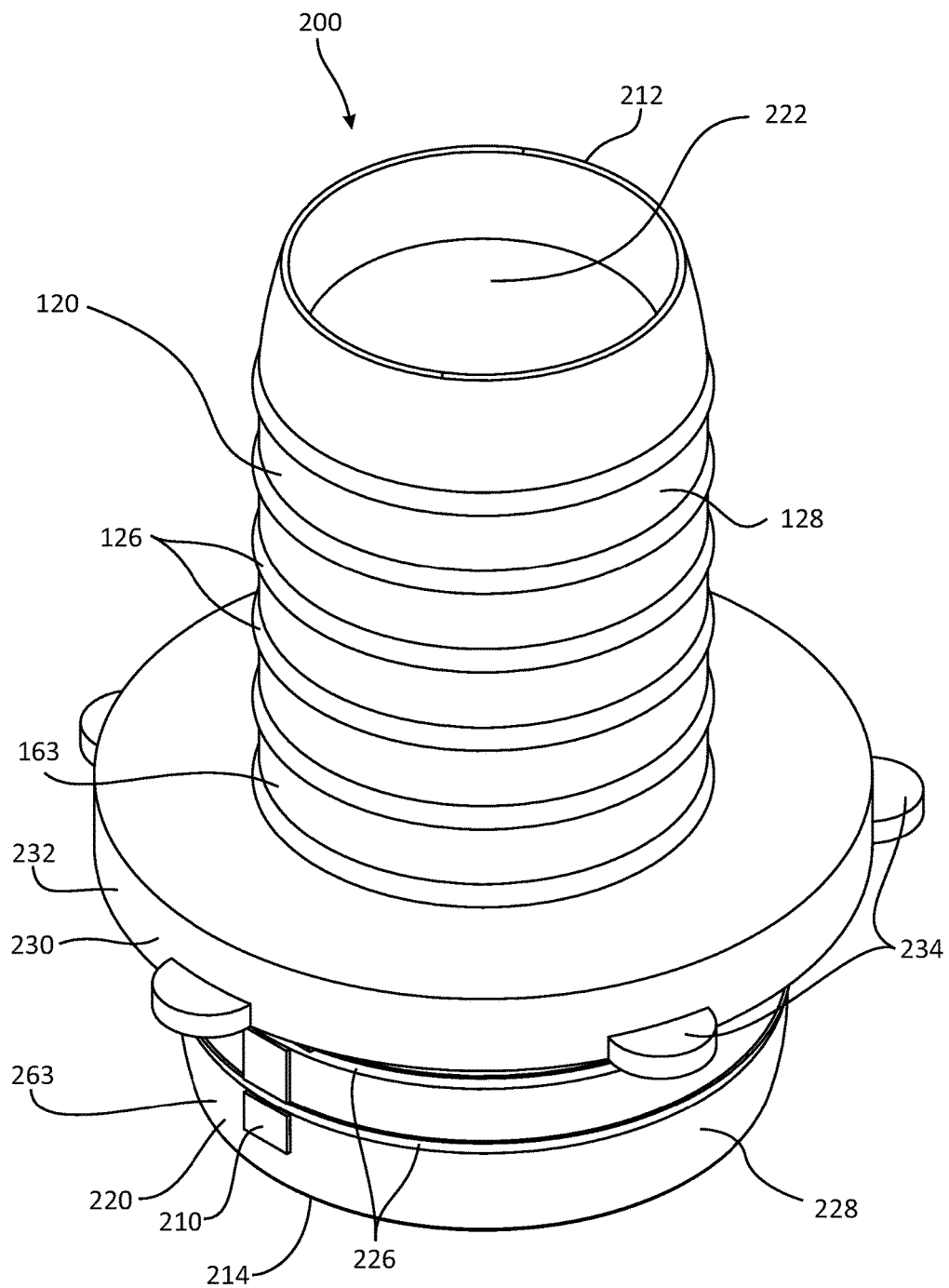
FIG. 11 is a lower, perspective view of the embodiment of the enhanced seal shown in FIG. 10.
Figure 12:
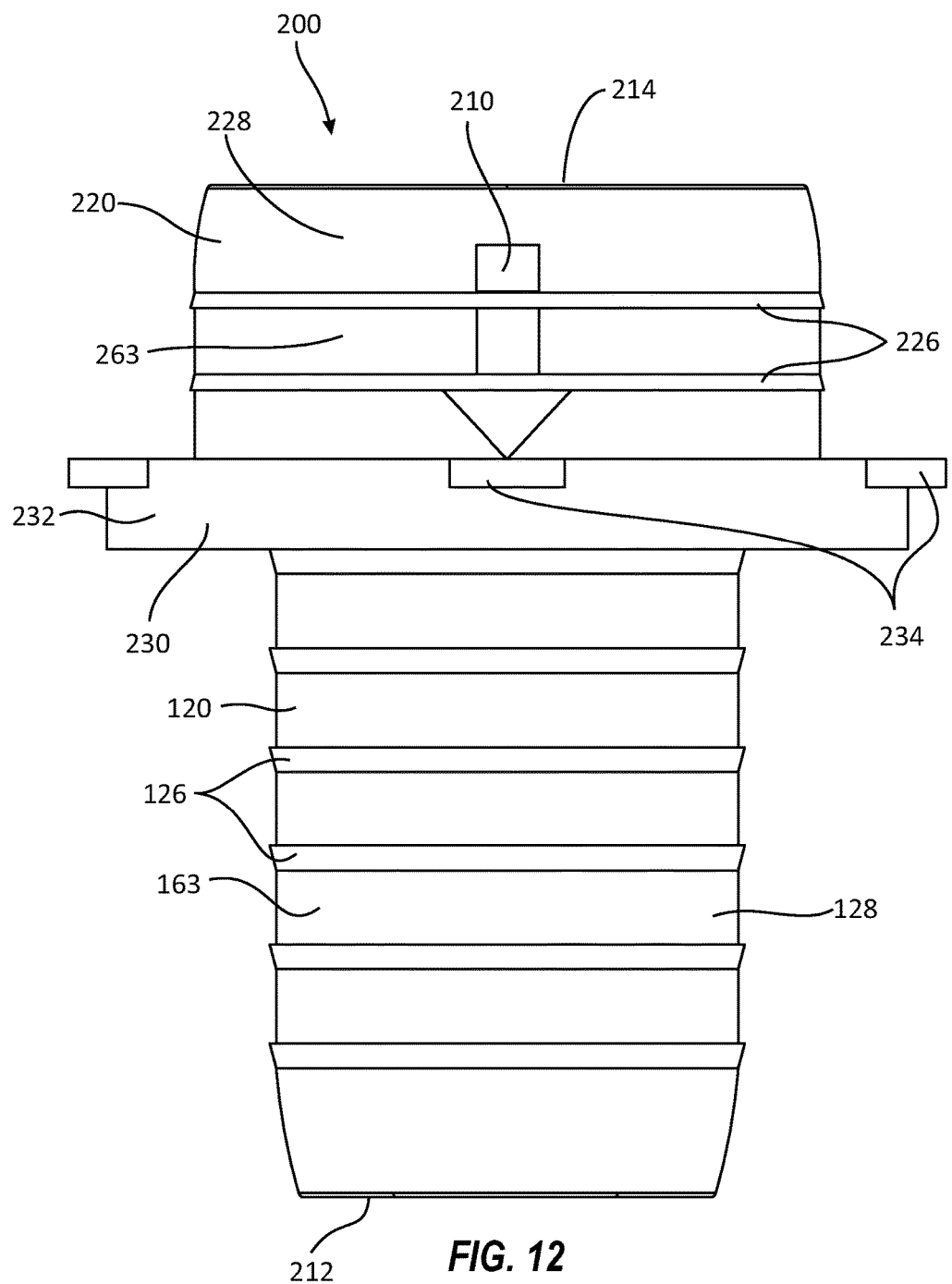
FIG. 12 is a side view of the embodiment of the enhanced seal shown in FIG. 10.
Figure 13:
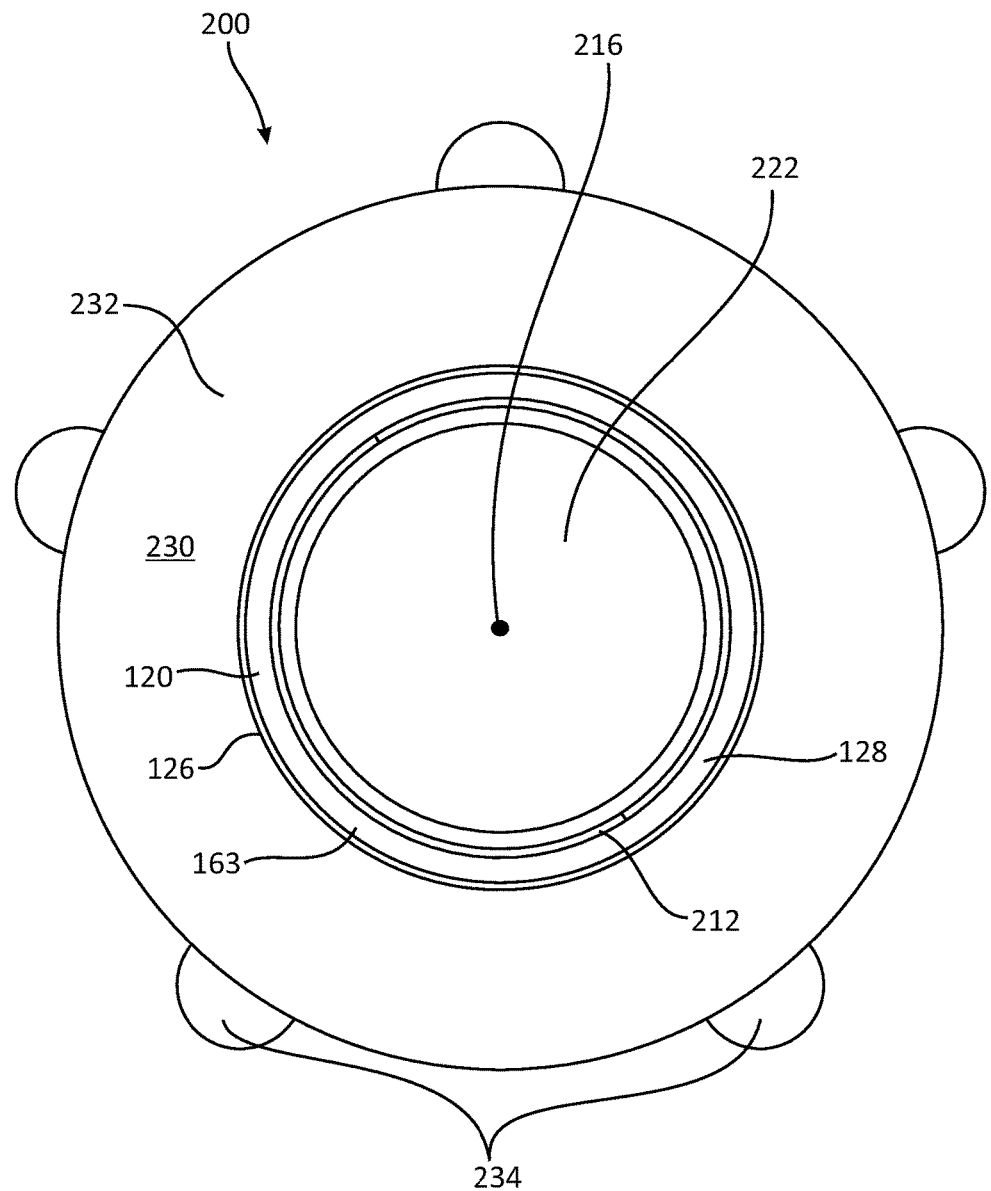
FIG. 13 is a bottom view of the embodiment of the enhanced seal shown in FIG. 10.
Figure 14:
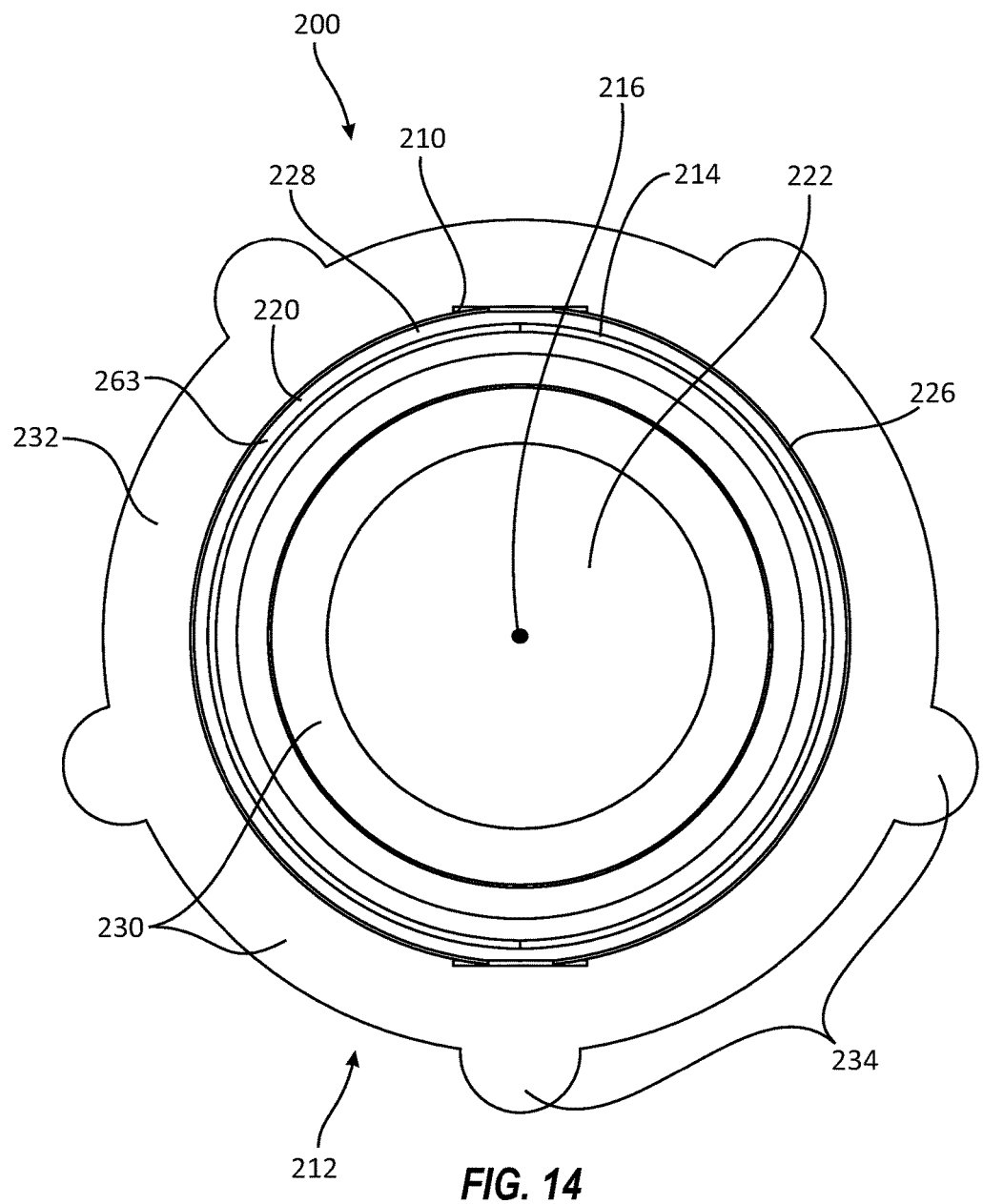
FIG. 14 is a top view of the embodiment of the enhanced seal shown in FIG. 10.

Referring now specifically to FIGS. 10-12, the second cylindrical portion 220, in various embodiments, may comprise a directional arrow 210 (best seen in FIGS. 10 and 12) positioned on the second cylindrical portion peripheral wall 228. In various alternative embodiments, the directional arrow 210 may be partially or completely disposed on the annular portion 230 and/or cylindrical portion 120. The directional arrow 210 indicates the direction of fluid flow (away from a pressurized fluid source) within the enhanced seal 200 when the enhanced seal 200 is properly installed and in use. The directional arrow 210 may, for example, be of a different color than remaining or surrounding portions of the enhanced seal 200 or may comprise a raised or recessed portion relative to surrounding portions of the enhanced seal 200.

Figure 15:
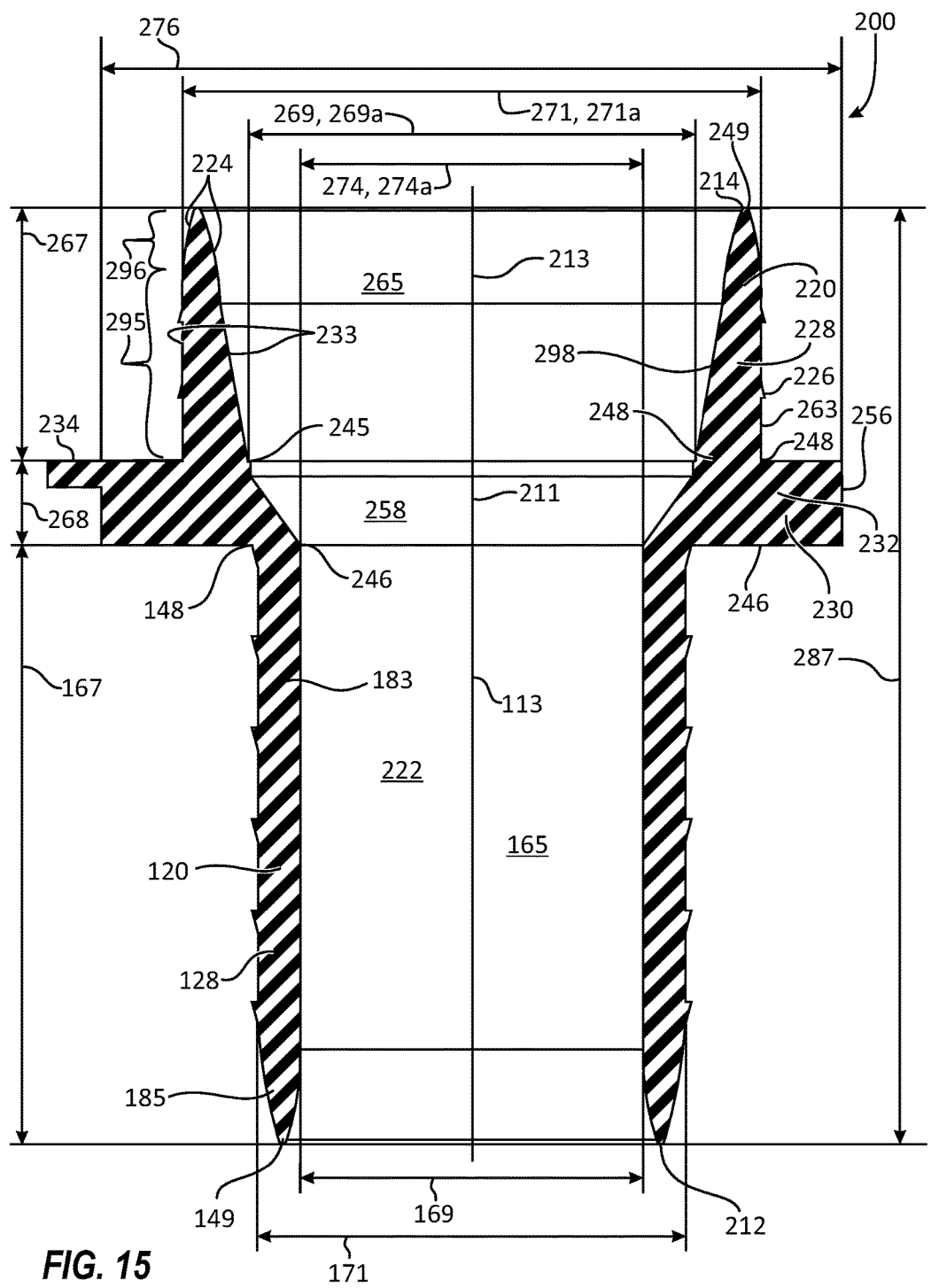
FIG. 15 is a side cross-sectional view of the embodiment of the enhanced seal shown in FIG. 10.

It should be noted that the cylindrical portion 120 illustrated in FIGS. 10-15 is identical to the cylindrical portion 120 shown in FIGS. 1-9. Accordingly, all the description and discussion related to the cylindrical portion 120 shown in FIGS. 1-9 applies to the description of the cylindrical portion 120 shown in FIGS. 10-15. Accordingly, as illustrated in FIG. 15, the cylindrical portion 120 may comprise a cylindrical portion peripheral wall 128 having a cylindrical portion distal end 149, cylindrical portion proximal end 148, and a portion of uniform thickness 183 and a narrowing portion 185. The cylindrical portion 120 may also comprise a cylindrical portion length dimension 167, a cylindrical portion inner dimension 169 and a cylindrical portion outer dimension 171.

The annular portion 230 shown in FIGS. 10-15 is similar, but not identical, to the annular portion 130 shown in FIGS. 1-6. In particular, there are at least three differences between the annular portion 230 shown in FIGS. 10-15 and the annular portion 130 shown in FIGS. 1-6, namely: (1) the annular portion inner dimension 274 (labeled and shown in FIG. 15) increases in a direction from the annular portion proximal end 246 (labeled and shown in FIG. 15) to the annular portion distal end 245 (labeled and shown in FIG. 15) relative to the annular portion minimum inner dimension 274a; (2) the second cylindrical portion 220 is either integrally formed with the annular portion 230 and/or cylindrical portion 120 or is otherwise attached to the annular portion 230, while, as indicated above, the second cylindrical portion 220 is not present in the embodiment of the enhanced seal 100 shown in FIGS. 1-6; and (3) the tabs 234 of the embodiment of FIGS. 10-15 are situated in a different position on the annular portion peripheral wall 232. Other than these three features, the description applicable to the annular portion 130 shown in FIGS. 1-6 applies to the annular portion 230 shown in FIGS. 10-15. Accordingly, the annular portion 230 may comprise an annular portion peripheral wall 232 having an annular portion length dimension 268, an annular portion outer dimension 276, and an annular portion inner dimension 274. The annular portion peripheral wall 232 may further comprise an annular portion proximal end 246 and an annular portion distal end 245. In addition, the annular portion 230 may further comprise one or more tabs 234.

Referring specifically now to FIG. 15 and referring generally to FIGS. 10-14, the second cylindrical portion 220 may comprise a second cylindrical portion peripheral wall 228. The second cylindrical portion peripheral wall 228 may comprise a second cylindrical portion distal end 249 and a second cylindrical portion proximal end 248. A second cylindrical portion interior surface 298 circumscribing a second cylindrical portion central passageway 265 extending from the second cylindrical portion distal end 249 to the second cylindrical portion proximal end 248. The second cylindrical portion peripheral wall 228 may also comprise a second cylindrical portion exterior surface 263. A second cylindrical portion length dimension 267 may extend from the second cylindrical portion distal end 249 to the second cylindrical portion proximal end 248. A second cylindrical portion inner dimension 269 may be perpendicular to the second cylindrical portion length dimension 267 and may extend between opposing sides of the second cylindrical portion interior surface 298. A second cylindrical portion outer dimension 271 may be perpendicular to the second cylindrical portion length dimension 267 and may extend between opposing sides of the second cylindrical portion exterior surface 263.

The second cylindrical portion proximal end 248 may abut the annular portion distal end 245, the annular portion proximal end 246 may abut (e.g., have a common boundary with) the cylindrical portion proximal end 148, the annular portion distal end 245 may abut the second cylindrical portion proximal end 248. The annular portion 230, the cylindrical portion 120, and the second cylindrical portion 220 may be integrally formed or may be secured to one another.

The second cylindrical portion peripheral wall 228 may comprise a region of uniform outer dimension 295 and a region of decreasing outer dimension 296. Within the region of decreasing outer dimension 296, the second cylindrical portion outer dimension 271 may decrease in a direction extending from the second cylindrical portion proximal end 248 to the second cylindrical portion distal end 249 relative to the second cylindrical portion maximum outer dimension 271a. In various embodiments and as illustrated in FIG. 15, the second cylindrical portion inner dimension 269 increases in a direction from the second cylindrical portion proximal end 248 toward the second cylindrical portion distal end 249 relative to the second cylindrical portion minimum inner dimension 269a. As illustrated in FIG. 15, the second cylindrical portion peripheral wall 228 may comprise portions of linear cross-sectional edges 233 or curved cross-sectional edges 224.

The second cylindrical portion 220 may also comprise one or more second cylindrical portion annular protrusions 226 extending from the second cylindrical portion exterior surface 263 of the second cylindrical portion peripheral wall 228. In various embodiments, each of the two or more second cylindrical portion annular protrusions 226 may be spaced apart along the second cylindrical portion length dimension 267.

As illustrated in FIG. 15, the annular portion inner dimension 274 may increase relative to the annular portion minimum inner dimension 274a in a direction extending from the annular portion proximal end 246 to the annular portion distal end 245. The annular portion 230 may also comprise one or more tabs 234. As shown in FIG. 15, the tabs 234 may be positioned on the annular portion exterior surface 256 of the annular portion peripheral wall 232. In the illustrated embodiment, the tabs 234 may be adjacent to the annular portion distal end 245 rather than the annular portion proximal end 246.

As illustrated in FIG. 15, the enhanced seal 200 may comprise a unified length dimension 287, which may comprise a sum of the second cylindrical portion length dimension 267, the annular portion length dimension 268 and cylindrical portion length dimension 167. The enhanced seal 200 may also comprise a unified central longitudinal axis 216, which comprises a combination of the second cylindrical portion central longitudinal axis 213, the annular portion central longitudinal axis 211, and the cylindrical portion central longitudinal axis 113. Also, the combination of the cylindrical portion central passageway 165, annular portion central passageway 258, and a second cylindrical portion central passageway 265 may be referred to as a unified central passageway 222.

It should be noted that the second cylindrical portion outer dimension 271 is greater than the cylindrical portion outer dimension 171. One reason for this is that the cylindrical portion 120 is designed to be inserted into a hose, while the second cylindrical portion 220 is designed to be inserted into a hose faucet. Hose faucets are often manufactured with much more precise tolerances and with less variation than hoses. Accordingly, the second cylindrical portion 220 may be wider and still properly fit within the vast majority of hose faucets. Also, the second cylindrical portion length dimension 267 is significantly less than the cylindrical portion length dimension 167 to accommodate insertion of the second cylindrical portion 220 into a hose faucet. In various embodiments, for example, as illustrated in FIG. 15, the cylindrical portion length dimension 167 may be at least two times the second cylindrical portion length dimension 267.

As indicated previously, the enhanced seal 200 comprises an upstream end 214 and a downstream end 212.

Figure 16:
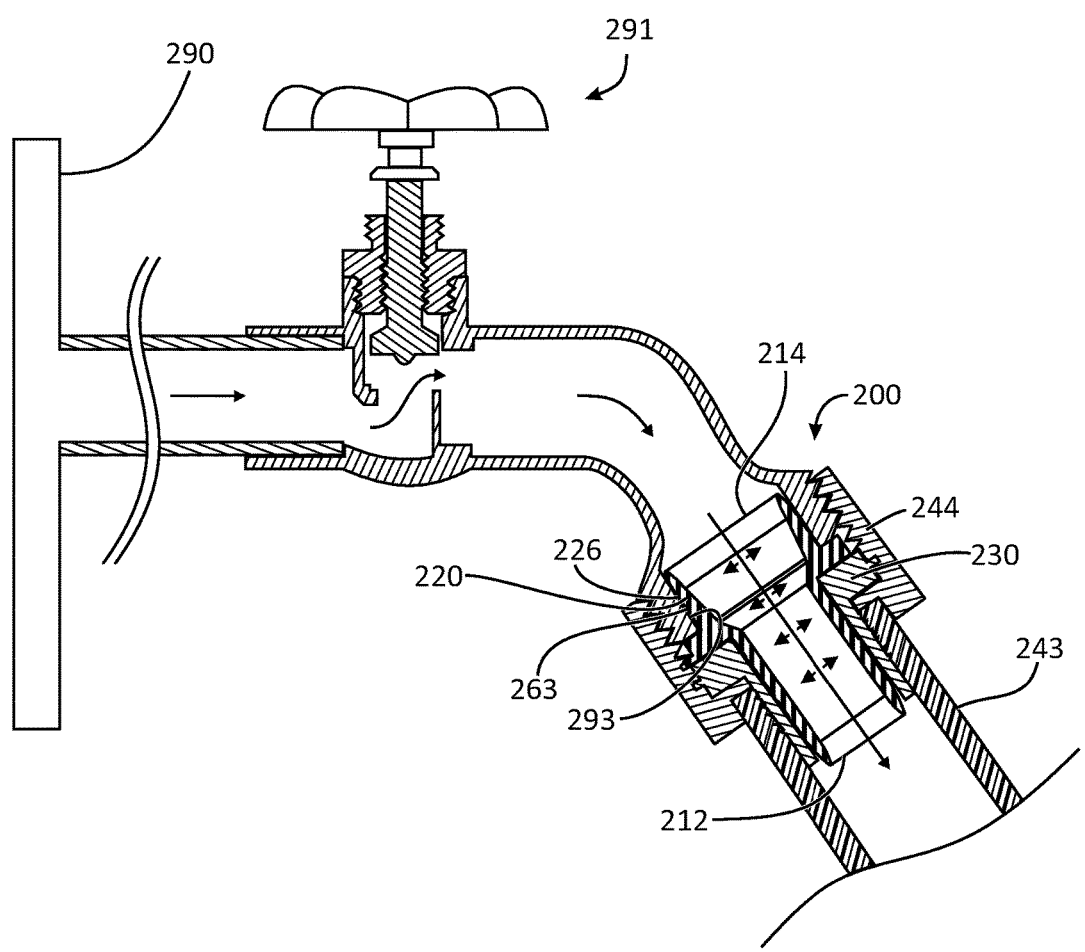
FIG. 16 is a side cross-sectional view of the embodiment of the enhanced seal shown in FIG. 10 disposed intermediate a conduit secured to a hose faucet, the hose shown in a cross-sectional view and the hose faucet shown in a partial cross-sectional view.

Referring now to FIG. 16, a partial cross-sectional view of a hose faucet 291 together with a partial cross-sectional view of the second embodiment of the enhanced seal 200 is shown together with a conduit 243 (e.g., a hose) having a coupling 244 and a pressurized fluid source 290. As illustrated, the coupling 244 secures the conduit 243 to the hose faucet 291. The upstream end 214 of the enhanced seal 200 is illustrated upstream of the downstream end 212 of the enhanced seal 200. As illustrated, the second cylindrical portion exterior surface 263 of the second cylindrical portion 220 and the second cylindrical portion annular protrusions 226 are shown adjacent to the interior surface 293 of the hose faucet 291 in a sealed engagement. The annular portion 230 is interposed between the hose faucet 291 and the coupling 244 in a sealed engagement.

Accordingly, the following method is disclosed. This method involves using the enhanced seal 200 to enhance a seal between a hose faucet 291 and a conduit 243 having a coupling 244. The coupling 244 may be configured to mate with the hose faucet 291. The hose faucet 291 is in fluid communication with a pressurized fluid source 290. The method may comprise positioning the enhanced seal 200 in the hose faucet 291, conduit 243 and/or coupling 244 such that the second cylindrical portion 220 will be upstream relative to the annular portion 230 when fluid from the pressurized fluid source 290 flows through the hose faucet 291 when the coupling 244 is secured to the hose faucet 291, and then securing the coupling 244 to the hose faucet 291.

FIGS. 17A-F, 18A-F and 19A-F illustrate another embodiment of an enhanced seal 300. These figures will be discussed concurrently for the sake of brevity unless a specific figure or set of figures is referenced in the discussion. In addition, as indicated previously, it should be noted that while a particular feature of the enhanced seal 300 may be illustrated a number of times within these figures, only select instances of the feature will be labeled with a reference numeral and lead line to mitigate overcrowding of the figures.

Figure 17A:
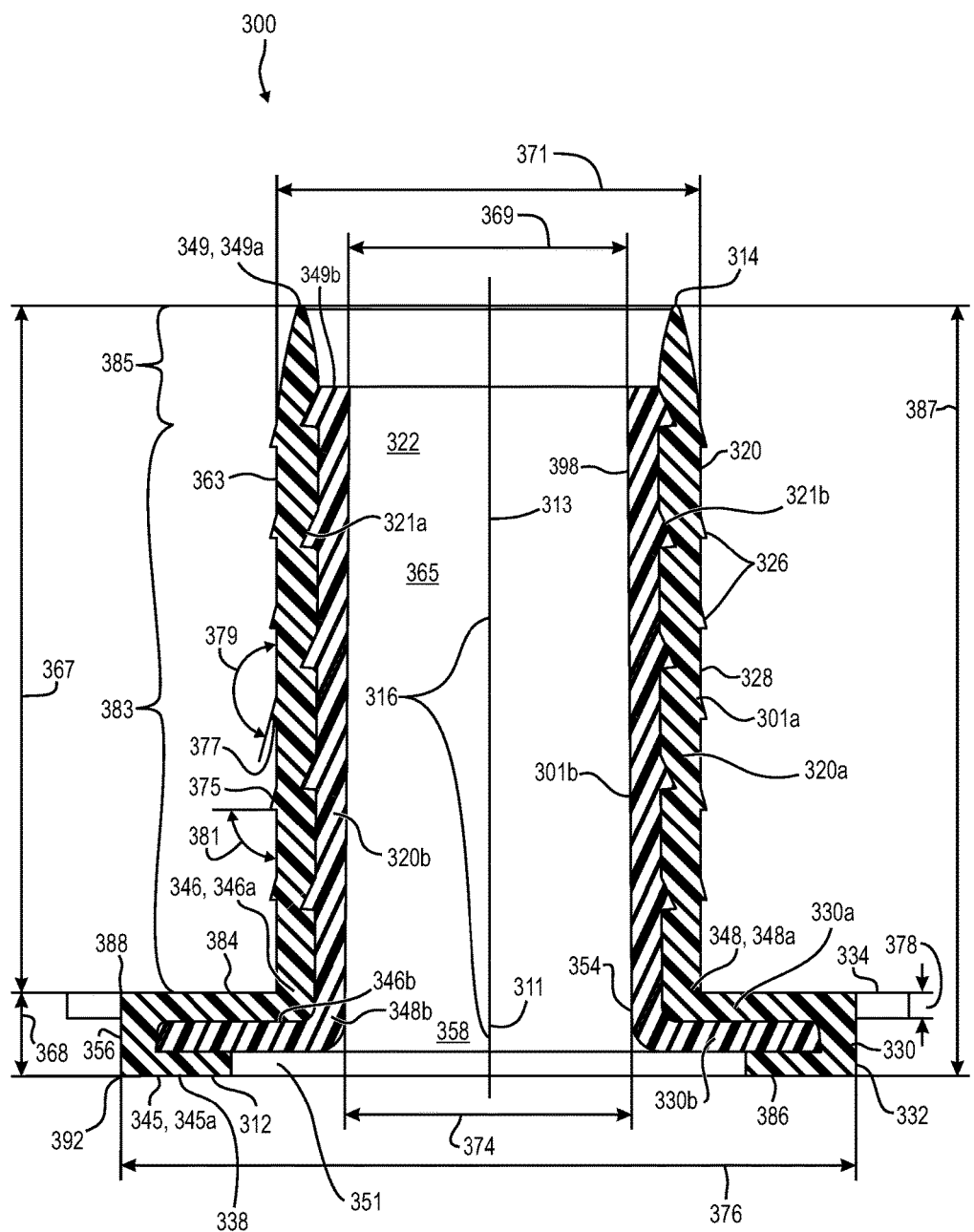
FIGS. 17A-F comprise various views of another embodiment of an enhanced seal. In particular, FIG. 17A comprises a side cross-sectional view (taken across the line 17A-17A in FIG. 17D), FIG. 17B comprises a top perspective view, FIG. 17C comprises a bottom perspective view, FIG. 17D comprises a side view, and, FIG. 17E comprises a top view, and FIG. 17F comprises a bottom view of this embodiment of the enhanced seal.
Figure 17B:
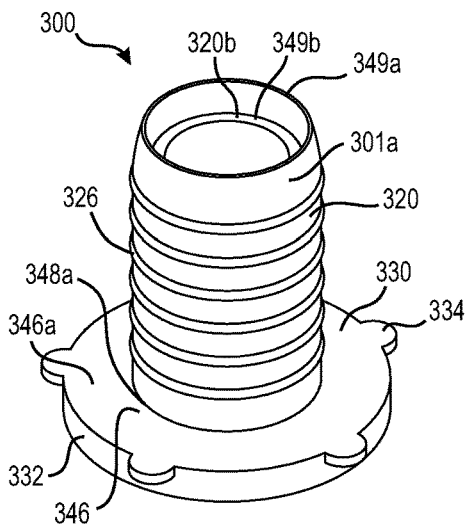
Figure 17C:
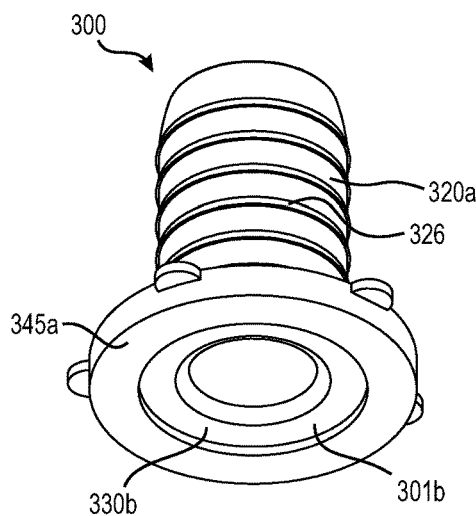
Figure 17D:
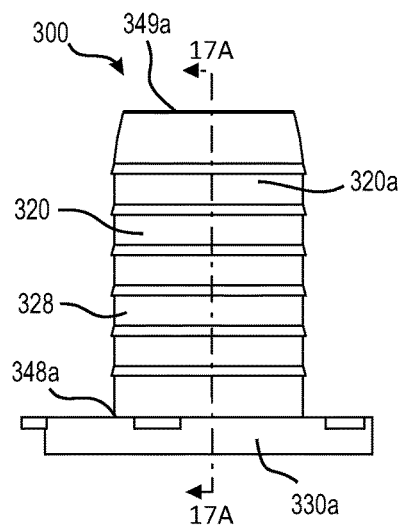
Figure 17E:
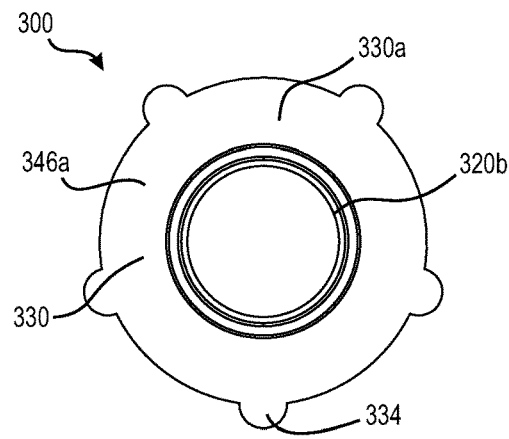
Figure 17F:
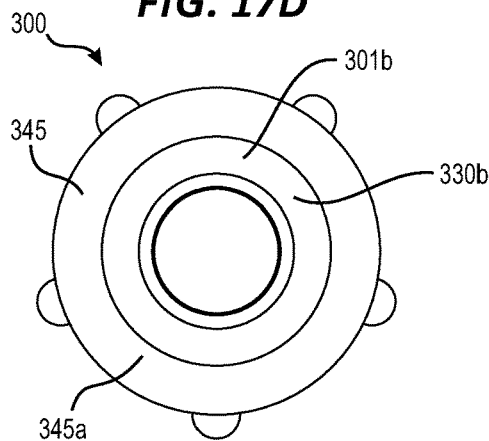

The enhanced seal 300 may comprise an annular portion 330 having an annular portion peripheral wall 332. The annular portion 330 may also comprise one or more tabs 334 extending radially outward from the annular portion peripheral wall 332. The enhanced seal 300 may also comprise a cylindrical portion 320 having a cylindrical portion peripheral wall 328. The cylindrical portion 320 may also comprise one or more annular protrusions 326 extending from a cylindrical portion exterior surface 363 of the cylindrical portion peripheral wall 328. The enhanced seal 300 may include a combined central passageway 322. The combined central passageway 322 may be cylindrical in shape and include a combined central longitudinal axis 316. The combined central passageway 322, as illustrated in FIG. 17A, may have a cylindrical shape, including a stepped cylindrical shape, which involves the shape of two or more cylinders with each cylinder having a different diameter in a stacked configuration. Although not illustrated in FIG. 17A, the enhanced seal 300 may also comprise a directional arrow 110 (shown in FIGS. 1-2), which indicates the direction of fluid flow during use of the enhanced seal 300. Accordingly, the enhanced seal 300 comprises an upstream end 314 and a downstream end 312.

The annular portion 330 may be generally in the shape of an annular disk and may comprise an annular portion peripheral wall 332. As illustrated in FIG. 17A, the annular portion 330 may comprise a recessed region 351. The annular portion peripheral wall 332 may comprise an annular portion distal end 345 and an annular portion proximal end 346. The annular portion distal end 345 is external to the enhanced seal 300, while the annular portion proximal end 346 is, at least in part, internal to the enhanced seal 300. The annular portion proximal end 346 abuts or is proximate the cylindrical portion 320, or, more specifically, abuts or is proximate the cylindrical portion proximal end 348.

The annular portion peripheral wall 332 may comprise an annular portion interior surface 354 and an annular portion exterior surface 356. The annular portion interior surface 354 may circumscribe the annular portion central passageway 358, which extends from the annular portion distal end 345 to the annular portion proximal end 346. The annular portion central passageway 358 may be cylindrical in shape, which includes a step cylindrical shape, as illustrated in FIGS. 17A-E.

Referring now more specifically to FIG. 17A, an annular portion length dimension 368 may extend from the annular portion distal end 345 to the annular portion proximal end 346. An annular portion inner dimension 374 (which comprises the narrowest portion of the annular portion interior surface 354) may be perpendicular to the annular portion length dimension 368 and may extend between opposing sides of the annular portion interior surface 354. An annular portion outer dimension 376 may be perpendicular to the annular portion length dimension 368 and may extend between opposing sides of the annular portion exterior surface 356.

Referring still specifically to FIGS. 17A-E, as indicated above, the annular portion 330 may comprise a series of circumferentially spaced tabs 334. The tabs 334 may be circumferentially spaced at regular or irregular intervals. The tabs 334 may extend radially outward from the annular portion exterior surface 356. In the embodiment illustrated in FIG. 6, the tabs 334 may be in the shape of a semi-cylinder. In alternative embodiments, the tabs 334 may have, for example, the shape of a cuboid, triangular prism, partial sphere or rectangular prism. As illustrated, the tabs 334 may have a tab length dimension 378 less than the annular portion length dimension 368 and may be situated on the annular portion exterior surface 356 adjacent to the annular portion proximal end 346 or the proximal planar surface 384 on the annular portion exterior surface 356. By way of example only, the annular portion length dimension 368 may be three to four times the tab length dimension 378. As will be explained herein, the tabs 334 may interact with and engage internal female threads into which the enhanced seal 300 may be positioned during use.

Referring still specifically to FIGS. 17A-E, the annular portion peripheral wall 332 may be in the shape of an annular disk (with an optional recessed region 351). Accordingly, the annular portion proximal end 346 may comprise a proximal planar surface 384, and the annular portion distal end 345 may comprise a distal planar surface 386. The annular portion exterior surface 356 has a rounded, cylindrical shape (i.e., the annular portion exterior surface 356 has the same shape of the exterior surface of a cylinder). As illustrated best in FIG. 17A, the proximal intersection 388 of the proximal planar surface 384 with the annular portion exterior surface 356 may be at a right angle. In alternative embodiments, this proximal intersection 388 may be rounded, scalloped, or chamfered. The distal intersection 392 of the distal planar surface 386 with the annular portion exterior surface 356, may likewise be, for example, at a right angle, as illustrated in FIG. 17A, or, alternatively, may be rounded, scalloped, or chamfered.

As indicated above, the enhanced seal 300 may comprise a cylindrical portion 320 comprising a cylindrical portion peripheral wall 328. The cylindrical portion peripheral wall 328 may be generally in the shape of a cylindrical shell. The cylindrical portion peripheral wall 328 comprises a cylindrical portion interior surface 398 and the cylindrical portion exterior surface 363. The cylindrical portion peripheral wall 328 comprises a cylindrical portion distal end 349, which is external to the enhanced seal 300, and a cylindrical portion proximal end 348, which is internal to the enhanced seal 300. The cylindrical portion interior surface 398 circumscribes a cylindrical portion central passageway 365, which extends from the cylindrical portion proximal end 348 to the cylindrical portion distal end 349. The cylindrical portion central passageway 365 may be generally cylindrical in shape (which includes a stepped cylindrical shape).

Referring still specifically to FIG. 17A and generally to FIGS. 17B-17F, a cylindrical portion length dimension 367 may extend from the cylindrical portion distal end 349 to the cylindrical portion proximal end 348. A cylindrical portion inner dimension 369 may be perpendicular to the cylindrical portion length dimension 367 and may extend between opposing sides of the narrowest portion of the cylindrical portion interior surface 398. A cylindrical portion outer dimension 371 may be perpendicular to the cylindrical portion length dimension 367 and may extend between opposing sides of the cylindrical portion exterior surface 363 (excluding the annular protrusions 326).

The cylindrical portion 320 may comprise a series of annular protrusions 326 that extend radially outward from the cylindrical portion exterior surface 363. The annular protrusions 326 may be spaced apart along the cylindrical portion length dimension 367. With reference specifically now to FIG. 17A, the annular protrusions 326, in various embodiments, may comprise a long face 375 and a short face 377. The long face 375 may be disposed at a long face angle 379 (e.g., an obtuse angle) with respect to an adjacent or adjoining portion of the cylindrical portion exterior surface 363. The short face 377 may be disposed at a short face angle 381 (e.g., an acute or right angle) with respect to an adjacent or adjoining portion of the cylindrical portion exterior surface 363. In various embodiments, the long face angle 379 may be greater than the short face angle 381. The annular protrusions 326 may be in the shape of a frustoconical shell (i.e., a peripheral portion of a frustum of a cone).

Referring still specifically to FIG. 17A and generally to FIGS. 17B-17F, the cylindrical portion peripheral wall 328 may comprise a portion of uniform thickness 383 and a narrowing portion 385. Within the portion of uniform thickness 383, a difference between the cylindrical portion outer dimension 371 and the cylindrical portion inner dimension 369 is the same (i.e., roughly the same taking into consideration any minor variation caused by the manufacturing process and excluding the annular protrusions 326). Stated differently, within the portion of uniform thickness 383, both the cylindrical portion outer dimension 371 and the cylindrical portion inner dimension 369 are the same (i.e., roughly the same taking into consideration any minor variation caused by the manufacturing process and excluding the annular protrusions 326).

The enhanced seal 300 illustrated in FIGS. 17A-E, 18A-E, and 19A-E, comprises an outer portion 301a and an inner portion 301b. Accordingly, the cylindrical portion 320 comprises an inner cylindrical portion 320b and an outer cylindrical portion 320a. The annular portion 330 comprises an inner annular portion 330b and an outer annular portion 330a.

The outer portion 301a is made from a first set of one or more materials, while the inner portion 301b is made from a second set of one or more materials. The outer portion 301a is softer and more flexible than the inner portion 301b. This difference in hardness enhances the performance of the enhanced seal 300 because the outer portion 301a may be softer to increase the sealing capabilities of the seal 300, while the inner portion 301b may be harder and less flexible than the outer portion 301a to provide support to and mitigate deformation of the seal 300 under pressure. In one embodiment, this configuration mitigates or prevents the seal 300 from inverting under pressure.

The annular portion 330 may comprise an annular portion central longitudinal axis 311 positioned within the annular portion central passageway 358, while the cylindrical portion 320 may comprise a cylindrical portion central longitudinal axis 313 positioned within the cylindrical portion central passageway 365. A combination of the annular portion central longitudinal axis 311 and the cylindrical portion central longitudinal axis 313 may be referred to as a combined central longitudinal axis 316. In the illustrated embodiment, the annular portion 330 encompasses a portion of the inner cylindrical portion 320b and the inner annular portion 330b.

The combined central passageway 322 (as best seen in FIG. 17A) may comprise a combination of the annular portion central passageway 358 and the cylindrical portion central passageway 365. The annular portion central passageway 358 may be cylindrical in shape; the cylindrical portion central passageway 365 may also be cylindrical in shape; and, further, the combined central passageway 322 may likewise be cylindrical in shape, which includes a stepped cylindrical shape.

The combined central longitudinal axis 316 may be centrally positioned within the combined central passageway 322. As indicated in connection with FIGS. 17A-E, the cylindrical portion peripheral wall 328, the annular portion peripheral wall 332, the annular protrusions 326 and the combined central passageway 322 may be symmetrical about any plane passing through the combined central longitudinal axis 316 (i.e., excluding the tabs 334).

It should also be noted that a combination of the annular portion length dimension 368 and the cylindrical portion length dimension 367 may be referred to as a combined length dimension 387 (i.e., a length dimension 387 of the enhanced seal 300, which may be referred to as the enhanced seal length dimension 387).

In various embodiments, the inner portion 301b may be integrally formed. In addition, the outer portion 301a may be integrally formed, such as through an overmolding process to secure the outer portion 301a to the inner portion 301b.

In various embodiments, the first set of one or more materials comprises EPDM rubber of a Shore A durometer between about 60 and about 70, between 60 and 70, between about 60 and about 65, between 60 and 65, is 65, or is about 65. In various embodiments, the second set of one or more materials comprises Polyoxymethylene (POM) (also known as acetal) of a Shore D durometer between about 80 and about 90, between 80 and 90 (or between about 115 to about 125 or between 115 and 125 on the Rockwell hardness scale). Accordingly, the first set of one or more materials may be within the Shore A durometer scale, while the second set of one or more materials may be within the Shore D durometer scale.

In one embodiment, the outer portion 301a may be bonded to the inner portion 301b using the overmolding process. Alternatively, for example, adhesives may be utilized to bond the outer portion to the inner portion.

Referring specifically to FIGS. 18A-E, the outer portion 301a may comprise an outer cylindrical portion 320a and an outer annular portion 330a. When the enhanced seal 300 is assembled, the inner cylindrical portion 320b is disposed within the outer cylindrical portion 320a, and the inner annular portion 330b is disposed within the outer annular portion 330a. The outer annular portion 330a comprises an annular lip 338 that aids in retaining the inner portion 301b within the outer portion 301a. The outer cylindrical portion 320a comprises an outer cylindrical portion proximal end 348a and an outer cylindrical portion distal end 349a. The outer annular portion 330a comprises an outer annular portion proximal end 346a and an outer annular portion distal end 345a. As indicated previously, the outer cylindrical portion 320a may include one or more annular protrusions 326, and the outer annular portion 330a may comprise a series of tabs 334.

Figure 18A:
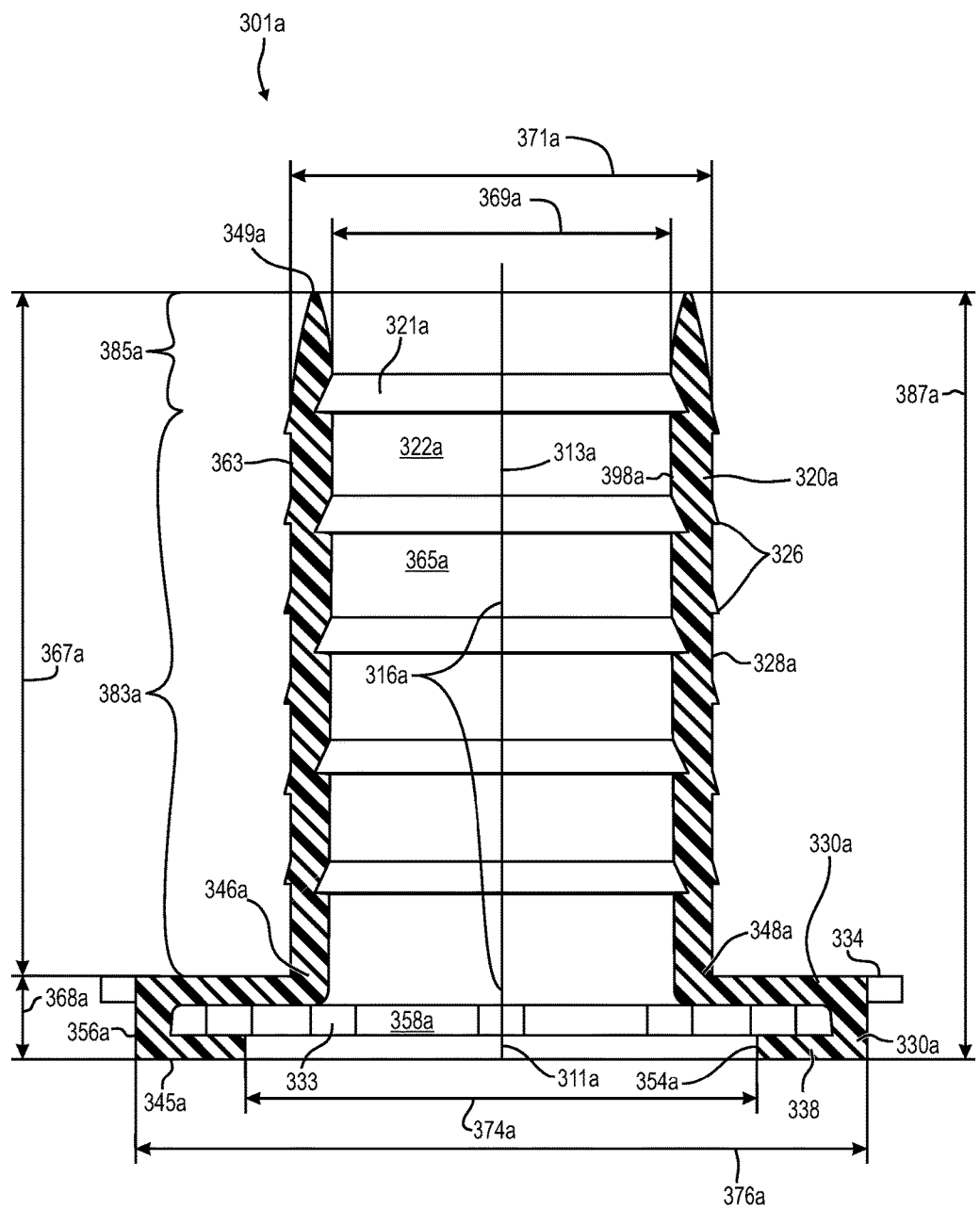
FIGS. 18A-F comprise various views of an outer portion of the enhanced seal shown in FIGS. 17A-F. In particular, FIG. 18A comprises a side cross-sectional view (taken across the line 18A-18A in FIG. 18D), FIG. 18B comprises a top perspective view, FIG. 18C comprises a bottom perspective view, FIG. 18D comprises a side view, and, FIG. 18E comprises a top view, and FIG. 18F comprises a bottom view of this embodiment of the enhanced seal.
Figure 18B:
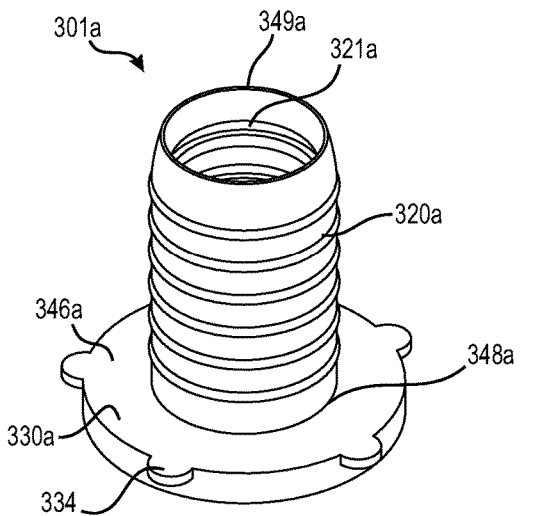
Figure 18C:
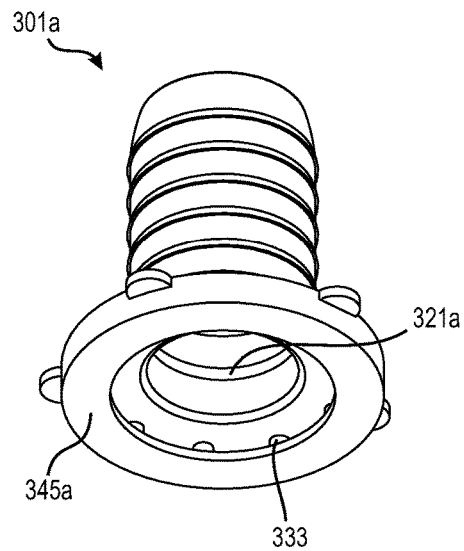
Figure 18D:
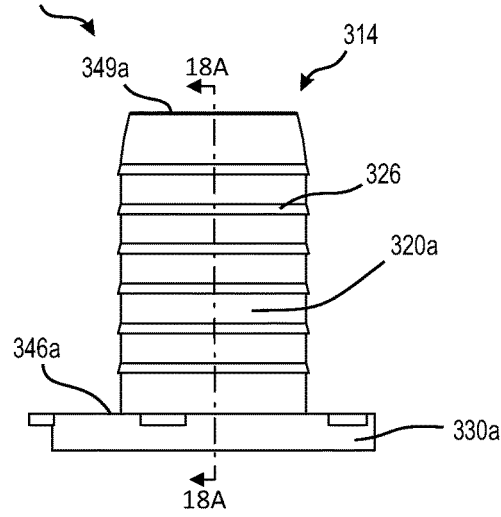
Figure 18E:
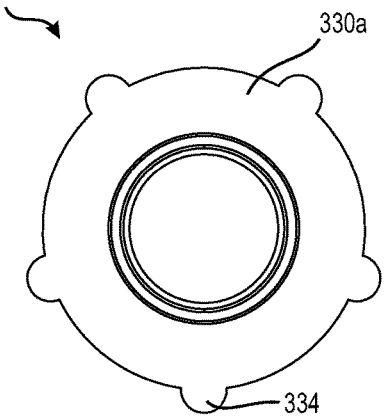
Figure 18F:
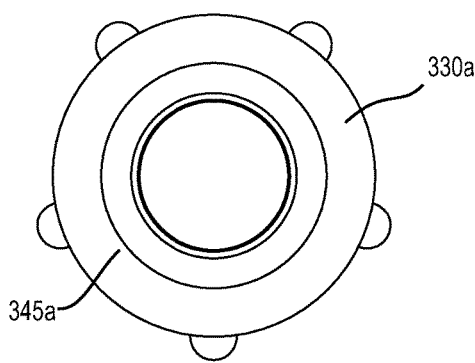

Referring specifically to FIG. 18A and generally to FIGS. 18B-F, the outer cylindrical portion interior surface 398a circumscribes an outer cylindrical portion central passageway 365a, which extends from the outer cylindrical portion proximal end 348a to the outer cylindrical portion distal end 349a. The outer cylindrical portion central passageway 365a may be generally cylindrical in shape and receives a portion of the inner portion 301b.

An outer cylindrical portion length dimension 367a may extend from the outer cylindrical portion distal end 349a to the outer cylindrical portion proximal end 348a. An outer cylindrical portion inner dimension 369a may be perpendicular to the outer cylindrical portion length dimension 367a and may extend between opposing sides of the narrowest portion of the outer cylindrical portion interior surface 398a. An outer cylindrical portion outer dimension 371a may be perpendicular to the outer cylindrical portion length dimension 367a and may extend between opposing sides of the cylindrical portion exterior surface 363 (e.g., the widest portion of the cylindrical portion exterior surface 363 excluding the annular protrusions 326).

The outer annular portion 330a may comprise an outer annular portion central longitudinal axis 311a positioned within the outer annular portion central passageway 358a, while the outer cylindrical portion 320a may comprise an outer cylindrical portion central longitudinal axis 313a positioned within the outer cylindrical portion central passageway 365a. A combination of the outer annular portion central longitudinal axis 311a and the outer cylindrical portion central longitudinal axis 313a may be referred to as a combined outer portion central longitudinal axis 316a.

The outer combined central passageway 322a (as best seen in FIG. 18A) may comprise a combination of the outer annular portion central passageway 358a and the outer cylindrical portion central passageway 365a. The outer annular portion central passageway 358a may be cylindrical in shape, which comprises a stepped cylindrical shape; the outer cylindrical portion central passageway 365a may also be cylindrical in shape; and, further, the outer combined central passageway 322a may likewise be cylindrical in shape, which also includes a stepped cylindrical shape.

Referring now more specifically to FIG. 18A, an outer annular portion length dimension 368a may extend from the outer annular portion distal end 345a to the outer annular portion proximal end 346a. An outer annular portion inner dimension 374a (which comprises the narrowest portion of the outer annular portion interior surface 354a) may be perpendicular to the outer annular portion length dimension 368a and may extend between opposing sides of the outer annular portion interior surface 354a. An outer annular portion outer dimension 376a may be perpendicular to the outer annular portion length dimension 368a and may extend between opposing sides of the outer annular portion exterior surface 356a. It should be noted that a combination of the outer annular portion length dimension 368a and the outer cylindrical portion length dimension 367a may be referred to as a combined outer portion length dimension 387a.

Referring still specifically to FIG. 18A, the outer cylindrical portion peripheral wall 328a may comprise a portion of uniform thickness 383a and a narrowing portion 385a. Within the portion of uniform thickness 383a, a difference between the outer cylindrical portion outer dimension 371a and the outer cylindrical portion inner dimension 369a is the same (i.e., roughly the same taking into consideration any minor variation caused by the manufacturing process and excluding the annular protrusions 326). The narrowing portion 385a may comprise, for example, the embodiments illustrated in FIGS. 7A-E.

The outer cylindrical portion 320a may also include one or more annular ridge recesses 321a that may engage annular ridges 321b on the inner cylindrical portion 320b. The annular ridge recesses 321a and annular ridges 321b serve to enhance the engagement between the inner portion 301b and the outer portion 301a and decrease the risk the outer portion 301a will shift or slide with respect to the inner portion 301b.

The outer annular portion 330a also comprises a series of columns 333 extending through openings 335 in the inner annular portion 330b. As noted above, the columns may be created if the outer annular portion 330a is over molded on top of the inner annular portion such that the material from which the outer annular portion is made flows into the openings 335.

Referring now specifically to FIGS. 19A-E, the inner portion 301b may comprise an inner cylindrical portion 320b and an inner annular portion 330b. The inner cylindrical portion 320b comprises an inner cylindrical portion proximal end 348b and an inner cylindrical portion distal end 349b. The inner annular portion 330b comprises an inner annular portion proximal end 346b and an inner annular portion distal end 345b.

Figure 19A:
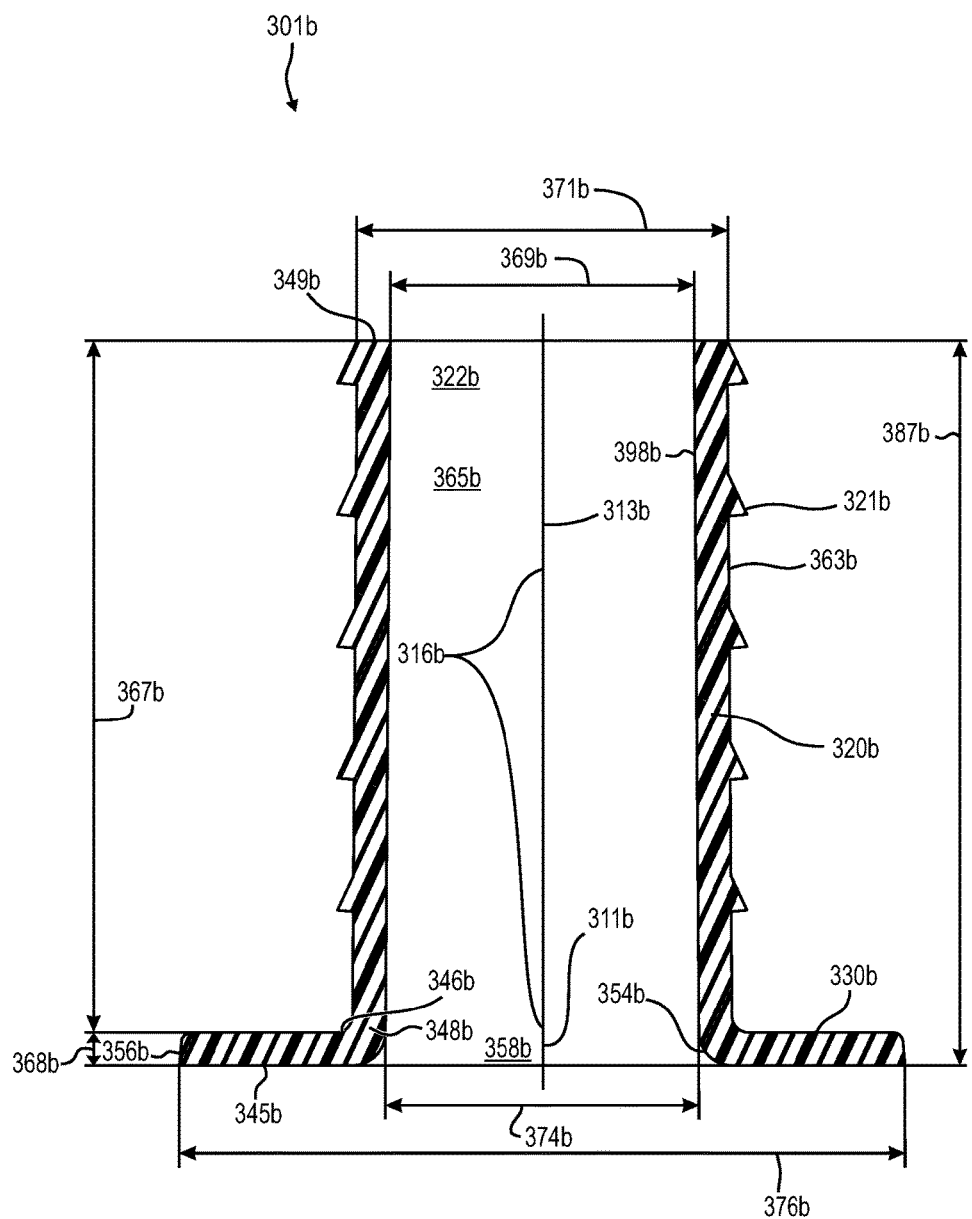
FIGS. 19A-F comprise various use of an inner portion of the enhanced seal shown in FIGS. 17A-F. In particular, FIG. 19A comprises a side cross-sectional view (taken across the line 19A-19A in FIG. 19D), FIG. 19B comprises a top perspective view, FIG. 19C comprises a bottom perspective view, FIG. 19D comprises a side view, and, FIG. 19E comprises a top view, and FIG. 19F comprises a bottom view of this embodiment of the enhanced seal.
Figure 19B:
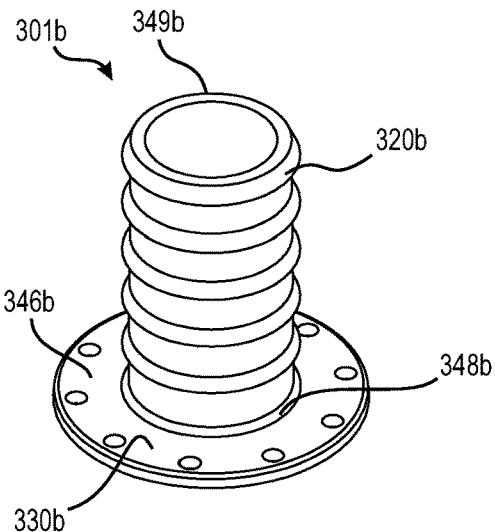
Figure 19C:
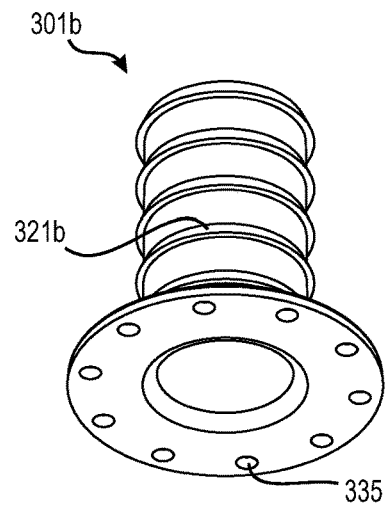
Figure 19D:
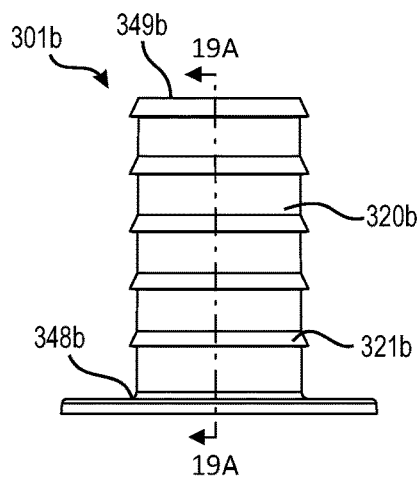
Figure 19E:
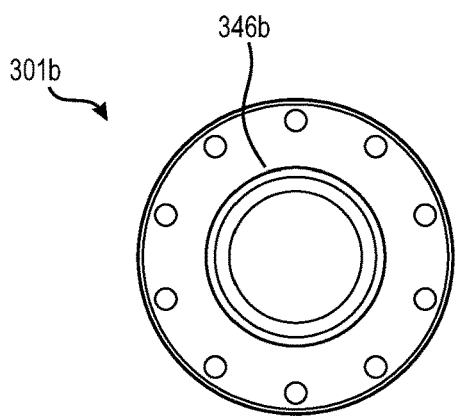
Figure 19F:
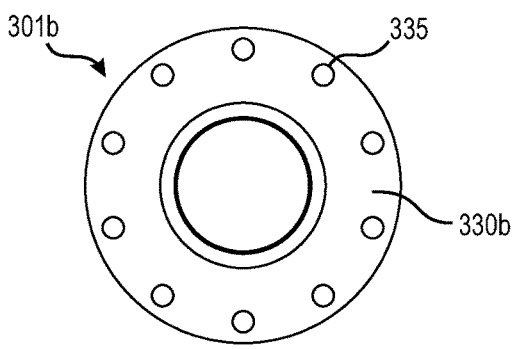

Referring specifically to FIG. 19A and generally to FIGS. 19B-F, the inner cylindrical portion interior surface 398b circumscribes an inner cylindrical portion central passageway 365b, which extends from the inner cylindrical portion proximal end 348b to the inner cylindrical portion distal end 349b. The inner cylindrical portion central passageway 365b may be generally cylindrical in shape.

Referring still specifically to FIG. 19A and generally to FIGS. 19B-F, an inner cylindrical portion length dimension 367b may extend from the inner cylindrical portion distal end 349b to the inner cylindrical portion proximal end 348b. An inner cylindrical portion inner dimension 369b may be perpendicular to the inner cylindrical portion length dimension 367b and may extend between opposing sides of the narrowest portion of the inner cylindrical portion interior surface 398b. An inner cylindrical portion outer dimension 371b may be perpendicular to the inner cylindrical portion length dimension 367b and may extend between opposing sides of the inner cylindrical portion exterior surface 363b (e.g., excluding the annular ridges 321b).

The inner annular portion 330b may comprise an inner annular portion central longitudinal axis 311b positioned within the inner annular portion central passageway 358b, while the inner cylindrical portion 320b may comprise an inner cylindrical portion central longitudinal axis 313b positioned within the inner cylindrical portion central passageway 365b. A combination of the inner annular portion central longitudinal axis 311b and the inner cylindrical portion central longitudinal axis 313b may be referred to as a combined inner portion central longitudinal axis 316b.

The inner combined central passageway 322b (as best seen in FIG. 19A) may comprise a combination of the inner annular portion central passageway 358b and the inner cylindrical portion central passageway 365b. The inner annular portion central passageway 358b may be cylindrical in shape, which comprises a stepped cylindrical shape; the inner cylindrical portion central passageway 365*b* may also be cylindrical in shape; and, further, the inner combined central passageway 322*b* may likewise be cylindrical in shape, which also includes a stepped cylindrical shape. Please note that for the purposes of this application, that the term "cylindrical" does not require that a particular feature be perfectly cylindrical. For example, the rounded edges illustrated in the inner annular portion 330*b* do not prevent the inner combined central passageway 322*b* from being categorized as cylindrical.

An inner annular portion length dimension 368*b* may extend from the inner annular portion distal end 345*b* to the inner annular portion proximal end 346*b*. An inner annular portion inner dimension 374*b* (which comprises the narrowest portion of the inner annular portion interior surface 354*b*) may be perpendicular to the inner annular portion length dimension 368*b* and may extend between opposing sides of the inner annular portion interior surface 354*b*. An inner annular portion outer dimension 376*b* may be perpendicular to the inner annular portion length dimension 368*b* and may extend between opposing sides of the inner annular portion exterior surface 356*b*. It should be noted that a combination of the inner annular portion length dimension 368*b* and the inner cylindrical portion length dimension 367*b* may be referred to as a combined inner portion length dimension 387*b*.

In various embodiments, the inner portion 301*b* may be integrally formed or formed by subparts secured to one another. In addition, the outer portion 301*a* may be integrally formed, such as through an overmolding process to secure the outer portion 301*a* to the inner portion 301*b*, or formed by subparts secured to one another.

It should be noted that the embodiment illustrated in FIGS. 17A-E, 18A-E, and 19A-E may incorporate various features shown throughout the application, including, for example, the features illustrated in FIGS. 7A-E.

The durometer ranges disclosed herein are designed for use in connection with systems having fluid pressure greater than or equal to 10 PSI and less than or equal to 150 PSI (e.g., in residential watering systems). These durometer ranges may be varied for systems that use pressures outside of this range.

As used in this application, the term "about" signifies plus or minus 3 Shore A durometer points or, if the Rockwell scale is used, plus or minus three points on the Rockwell scale. If the enhanced seal 100, 200 is formed from a softer material (below the durometer ranges identified above), the enhanced seal 100, 200 may collapse and fail to form a proper seal. If the enhanced seal 100, 200 is formed from a harder material (above these ranges), the enhanced seal 100, 200 may be too rigid and, once again, may not form a proper seal within the PSI range identified above. In systems in which the pressure is above this range, the enhanced seal 100, 200 may be formed of a material having a higher durometer. The enhanced seal 100, 200 may also be formed from various materials beyond EPDM, such as latex rubber, natural rubber, silicone and other materials having resiliency and other characteristics similar to rubber. The third embodiment of the enhanced seal 300 may use a softer material in the outer portion 301*a* because the strength and rigidity provided by the inner portion 301*b* avoids, or at least mitigates, the risk of the enhanced seal 300 collapsing or inverting.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one embodiment, the cylindrical portion length dimension 167 or outer cylindrical portion length dimension 367*a* may be at least 22 mm such that the cylindrical portion 120 extends well beyond the coupling of a conduit or hose with which the enhanced seal 100, 200, 300 is engaged such that the cylindrical portion exterior surface 163 and/or annular protrusions 126 can form a sealed engagement with the interior surface of the conduit or hose. In various embodiments, the cylindrical portion length dimension 167 may be at least two, three, or four times the annular portion length dimension 168, 268. In one embodiment, the annular portion outer dimension 176, 276 may be at least 1.1, 1.2, 1.3 or 1.4 times the cylindrical portion outer dimension 171 or the second cylindrical portion outer dimension 271. In various embodiments, the outer annular portion outer dimension 376*a* is greater than (e.g., at least 1.1, 1.2, 1.3 or 1.4 times greater than) the outer cylindrical portion outer dimension 371*a*, and the outer cylindrical portion length dimension 367*a* is at least twice (e.g., at least two, three, or four times) as great as the outer annular portion length dimension 368*a*.

It should also be noted that the combined central passageway 122, 322 illustrated in the figures is cylindrical in shape. In alternative embodiments, the combined or unified passageway may have the shape of a hexagonal or octagonal prism. It should also be noted that in certain embodiments when circular, cylindrical, or rounded regions are employed, the dimensions mentioned above may comprise diameters rather than merely dimensions.

As used in this application, the term coaxially aligned, or its grammatical variants, refers to a relative position of two items in which a central longitudinal axis of each of the items are situated such that the central longitudinal axis of each item if extended infinitely would occupy or comprise the same line.

The previous description of the disclosed aspects is provided to enable any person skilled in the art to make or use the present disclosure. Various modifications to these aspects will be readily apparent to those skilled in the art, and the general principles defined herein may be applied to other aspects without departing from the scope of the disclosure. For example, the number of the tabs 134, 234, 334 and the number of annular protrusions 126, 226, 326 shown in the figures are merely illustrative. The number of these items 126, 134, 226, 234, 326, 334 may be varied within the scope of the disclosed subject matter. Thus, the present disclosure is not intended to be limited to the aspects shown herein but is to be accorded the widest scope consistent with the principles and novel features disclosed.

What is claimed is:

1. An enhanced seal, comprising:
    an outer portion comprising an outer cylindrical portion and an outer annular portion,
        the outer cylindrical portion comprising an outer cylindrical portion proximal end, an outer cylindrical portion distal end, an outer cylindrical portion outer dimension, and an outer cylindrical portion length dimension extending from the outer cylindrical portion proximal end to the outer cylindrical portion distal end,
        the outer annular portion comprising an outer annular portion proximal end, an outer annular portion distal end, an outer annular portion outer dimension and an outer annular portion length dimension extending from the outer annular portion proximal and to the outer annular portion distal end, the outer cylindrical portion proximal end being secured to or integrally formed with the outer annular portion proximal end, the outer annular portion outer dimension being greater than the outer cylindrical portion outer dimension, and the outer cylindrical portion length dimension being at least twice as great as the outer annular portion length dimension;

an inner portion comprising an inner cylindrical portion and an inner annular portion, the inner cylindrical portion being secured to or integrally formed with the inner annular portion, the inner cylindrical portion being disposed at least partially within the outer cylindrical portion, the inner annular portion being disposed at least partially within the outer annular portion, a combination of the inner portion and the outer portion defining a central passageway, the outer portion comprising a first set of one or more materials having a hardness within a Shore A durometer scale; and the inner portion comprising a second set of one or more materials having a hardness within a Shore D durometer scale.

2. The enhanced seal of claim 1, wherein the first set of one or more materials is between about 60 and about 70 on the Shore A durometer scale.

3. The enhanced seal of claim 2, wherein the first set of one or more materials is between 60 and 70 on the Shore A durometer scale.

4. The enhanced seal of claim 1, wherein the second set of one or more materials is between about 80 and about 90 on the Shore D durometer scale.

5. The enhanced seal of claim 4, wherein the second set of one or more materials is between 80 and 90 on the Shore D durometer scale.

6. The enhanced seal of claim 1, wherein the outer cylindrical portion comprises a narrowing portion and a portion of uniform thickness.

7. The enhanced seal of claim 1, further comprising a set of two or more annular protrusions extending radially outward from an exterior surface of the outer cylindrical portion, wherein each of the set of two or more annular protrusions are separated by an intervening space along the outer cylindrical portion length dimension.

8. An enhanced seal, comprising:

an outer portion comprising an outer cylindrical portion and an outer annular portion, the outer cylindrical portion comprising an outer cylindrical portion proximal end, an outer cylindrical portion distal end, an outer cylindrical portion outer dimension, and an outer cylindrical portion length dimension extending from the outer cylindrical portion proximal end to the outer cylindrical portion distal end, the outer annular portion comprising an outer annular portion proximal end, an outer annular portion distal end, an outer annular portion outer dimension and an outer annular portion length dimension extending from the outer annular portion proximal and to the outer annular portion distal end, the outer cylindrical portion proximal end disposed closer to the outer annular portion proximal end than the outer annular portion distal end, the outer annular portion outer dimension being greater than the outer cylindrical portion outer dimension;

an inner portion comprising an inner cylindrical portion and an inner annular portion, the inner cylindrical portion being disposed at least partially within the outer cylindrical portion, the inner annular portion being disposed at least partially within the outer annular portion, a combination of the inner portion and the outer portion defining a central passageway, the outer portion comprising a first set of one or more materials having a hardness within a Shore A durometer scale; and the inner portion comprising a second set of one or more materials having a hardness within a Shore D durometer scale.

9. The enhanced seal of claim 8, wherein the first set of one or more materials is between about 60 and about 70 on the Shore A durometer scale.

10. The enhanced seal of claim 9, wherein the first set of one or more materials is between 60 and 70 on the Shore A durometer scale.

11. The enhanced seal of claim 8, wherein the second set of one or more materials is between about 80 and about 90 on the Shore D durometer scale.

12. The enhanced seal of claim 11, wherein the second set of one or more materials is between 80 and 90 on the Shore D durometer scale.

13. The enhanced seal of claim 8, wherein the outer cylindrical portion comprises a narrowing portion and a portion of uniform thickness.

14. The enhanced seal of claim 8, further comprising a set of two or more annular protrusions extending radially outward from an exterior surface of the outer cylindrical portion, wherein each of the set of two or more annular protrusions are separated by an intervening space along the outer cylindrical portion length dimension.

15. A method of using the enhanced seal of claim 1 to enhance a seal between a first conduit having a first coupling and a second conduit having a second coupling, the second coupling being configured to mate with the first coupling, the first conduit being selectively in fluid communication with a pressurized fluid source, comprising;

positioning the enhanced seal in either the first coupling or the second coupling such that the outer cylindrical portion is upstream relative to the outer annular portion when fluid from the pressurized fluid source flows through the first conduit and the second conduit and when the first coupling and second coupling are secured together; and securing the first coupling and second coupling together.

* * * * *